United States Patent
Lepeska

(10) Patent No.: US 10,931,773 B1
(45) Date of Patent: *Feb. 23, 2021

(54) FASTER WEB BROWSING USING HTTP OVER AN AGGREGATED TCP TRANSPORT

(71) Applicant: ViaSat, Inc., Carlsbad, CA (US)

(72) Inventor: Peter Lepeska, Boston, MA (US)

(73) Assignee: VIASAT, INC., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/448,484

(22) Filed: Jun. 21, 2019

Related U.S. Application Data

(63) Continuation of application No. 14/212,538, filed on Mar. 14, 2014, now Pat. No. 10,375,192.

(60) Provisional application No. 61/801,065, filed on Mar. 15, 2013.

(51) Int. Cl.
*H04L 29/08* (2006.01)

(52) U.S. Cl.
CPC .................................. *H04L 67/28* (2013.01)

(58) Field of Classification Search
CPC ... H04L 67/02; H04L 67/1002; H04L 67/101; H04L 67/28; H04L 67/2814; H04L 69/16
See application file for complete search history.

(56) References Cited

U.S. PATENT DOCUMENTS

| | | | |
|---|---|---|---|
| 6,085,193 A | 7/2000 | Malkin et al. | |
| 6,826,405 B2* | 11/2004 | Doviak | H04L 12/5692 |
| | | | 455/445 |
| 8,335,838 B2 | 12/2012 | Zhang et al. | |
| 8,341,245 B1 | 12/2012 | Roskind et al. | |
| 8,478,843 B1 | 7/2013 | Ortlieb et al. | |
| 9,083,583 B1 | 7/2015 | Roskind et al. | |
| 9,135,364 B1 | 9/2015 | Sundaram et al. | |
| 2002/0010761 A1 | 1/2002 | Carneal et al. | |
| 2004/0153549 A1* | 8/2004 | Naito | H04L 29/06 |
| | | | 709/228 |
| 2005/0254435 A1* | 11/2005 | Moakley | H04L 67/327 |
| | | | 370/252 |
| 2008/0114773 A1 | 5/2008 | Choi et al. | |
| 2009/0210513 A1* | 8/2009 | Boss | H04L 67/2823 |
| | | | 709/219 |
| 2011/0225302 A1* | 9/2011 | Park | H04L 69/14 |
| | | | 709/227 |
| 2013/0297561 A1 | 11/2013 | Mizrotsky et al. | |

(Continued)

OTHER PUBLICATIONS

U.S. Appl. No. 14/212,538, "Notice of Allowance", dated Mar. 22, 2019, 10 pages.

(Continued)

*Primary Examiner* — Gil H. Lee
(74) *Attorney, Agent, or Firm* — Chang & Hale LLP

(57) ABSTRACT

The present invention relates to systems, apparatus, and methods of using connection models to optimize web page transactions. In certain embodiments, latency and download speed data may be associated with a unique identifier for a connection to create a model, and this information may be used to assign certain objects that are part of a web page transaction to certain connections based on the connection model for each connection. In further potential embodiments, dependency structures in a web transaction may further be identified and used with connection models to optimize web page transactions.

28 Claims, 23 Drawing Sheets

(56) References Cited

U.S. PATENT DOCUMENTS

| | | | |
|---|---|---|---|
| 2014/0143431 A1* | 5/2014 | Watson | H04L 65/4084 709/227 |
| 2014/0258365 A1* | 9/2014 | L'Heureux | H04L 67/14 709/203 |
| 2015/0156194 A1 | 6/2015 | Modi et al. | |

OTHER PUBLICATIONS

U.S. Appl. No. 14/212,538, "Final Office Action", dated Oct. 18, 2018, 30 pages.
U.S. Appl. No. 14/212,538, "Non-Final Office Action", dated May 21, 2018, 26 Pages.
U.S. Appl. No. 14/212,538, "Final Office Action", dated Sep. 21, 2017, 30 pages.
U.S. Appl. No. 14/212,538, "Non-Final Office Action", dated Mar. 15, 2017, 28 pages.
U.S. Appl. No. 14/212,538, "Final Office Action", dated Oct. 19, 2016, 25 pages.
U.S. Appl. No. 14/212,538, " Non-Final Office Action", dated May 12, 2016, 25 pages.

* cited by examiner

FASTER WEB BROWSING USING HTTP OVER AN AGGREGATED TCP TRANSPORT

CROSS-REFERENCE TO RELATED APPLICATION

This application is a continuation of U.S. Nonprovisional application Ser. No. 14/212,538, filed Mar. 14, 2014, entitled "Faster Web Browsing Using HTTP Over an Aggregated TCP Transport," which claims the benefit of U.S. Provisional Application No. 61/801,065, filed on Mar. 15, 2013, entitled "Faster Web Browsing Using HTTP Over an Aggregated TCP Transport," which are both hereby incorporated herein in their entireties for all purposes.

BACKGROUND

Web page transmission, in which a user selects web page content and receives objects, is a core part of the Internet experience for Internet users. While the experience of users is typically a single selection followed by the viewing of a web page that is presented on the screen, the process of presenting the web page on the screen can involve a large number of objects and multiple request/response round trip communications from the user system to a system that is providing the web page.

Transmission Control Protocol (TCP) is one of the core protocols of the Internet protocol suite, complementing the Internet Protocol (IP) to make up the TCP/IP protocol suite. TCP is structured to provide reliable ordered delivery of a stream of data from a program on one computer to another program on another computer. Hypertext transfer protocol (HTTP) is a protocol that may then use TCP to transfer objects in various web page transactions and transfer of objects over network connections. TCP emphasizes reliability as opposed to, for example, the User Datagram Protocol, which emphasizes reduced latency over reliability. In certain environments, the structure of TCP in emphasizing reliability may slow the experience of a web browser.

For example, TCP uses a "slow start" algorithm to control congestion inside a network. Slow start functions to avoid sending more data than a network is capable of transmitting. "Slow start" is also known as the exponential growth phase of a TCP communication. During the exponential growth phase, slow-start works by increasing the TCP congestion window each time the acknowledgment is received. It increases the window size by the number of segments acknowledged. This happens until either an acknowledgment is not received for some segment or a predetermined threshold value is reached. If a loss event occurs, TCP assumes that it is due to network congestion and takes steps to reduce the offered load on the network. Once the threshold has been reached, TCP enters the linear growth (congestion avoidance) phase.

One method of improving the performance of web page transmission and presentation is HTTP prefetching. HTTP prefetching typically involves pre-requesting content on behalf of a client or browser before a request for that content is actually generated as a typical HTTP request and response in the course of a typical web page transaction. Certain prefetching embodiments involve pre-requesting content based on predictions about a future user selection without any actual action or selection by the user. Other HTTP prefetching systems, such as the systems discussed here, involve pre-requesting content in response to a user action or selection as part of a web page transaction. In such systems, when content is prefetched it may become possible to satisfy the request for that content locally (with regard to the client or browser) or at a location with a lower latency to the user, thereby negating the need to transmit the request and wait for the response from a content server. For example, in cases where there exists high latency between the client generating the request and the server which responds with the content requested, each negated request/response may avoid the penalty for such latency, thereby potentially reducing the total time required to satisfy the entire series of requests for the client. This may result in an accelerated end user experience.

The use of prefetching, along with other improvements to reduce the waterfall effects of chained requests in a web transaction, have created circumstances in which web browser applications need to download a large number of small objects simultaneously. In HTTP 1.x browsers, one of the limited ways to achieve this is to transfer the objects over a large number of TCP connections. However, this leads to degraded performance because most of the transfer time is then spent in the TCP "slow start" phase because TCP starts slowly and is not designed to transfer small objects at high performance. Another way is to use pipelining, but this causes problems with "head of line blocking".

One potential solution to this problem is known as SPDY. SPDY involves the multiplexing and interleaving of data for any number of objects over a single TCP connection. SPDY includes additional issues, though, such as serial transmission delay and "head of line blocking" where a lost packet for the object at the head causes other objects to have to wait to be read even if they have been transferred successfully. There is therefore a need for additional improvements for faster web browsing.

BRIEF DESCRIPTION OF THE DRAWINGS

The present disclosure is described in conjunction with the appended figures.

DETAILED DESCRIPTION

Figure 1A:
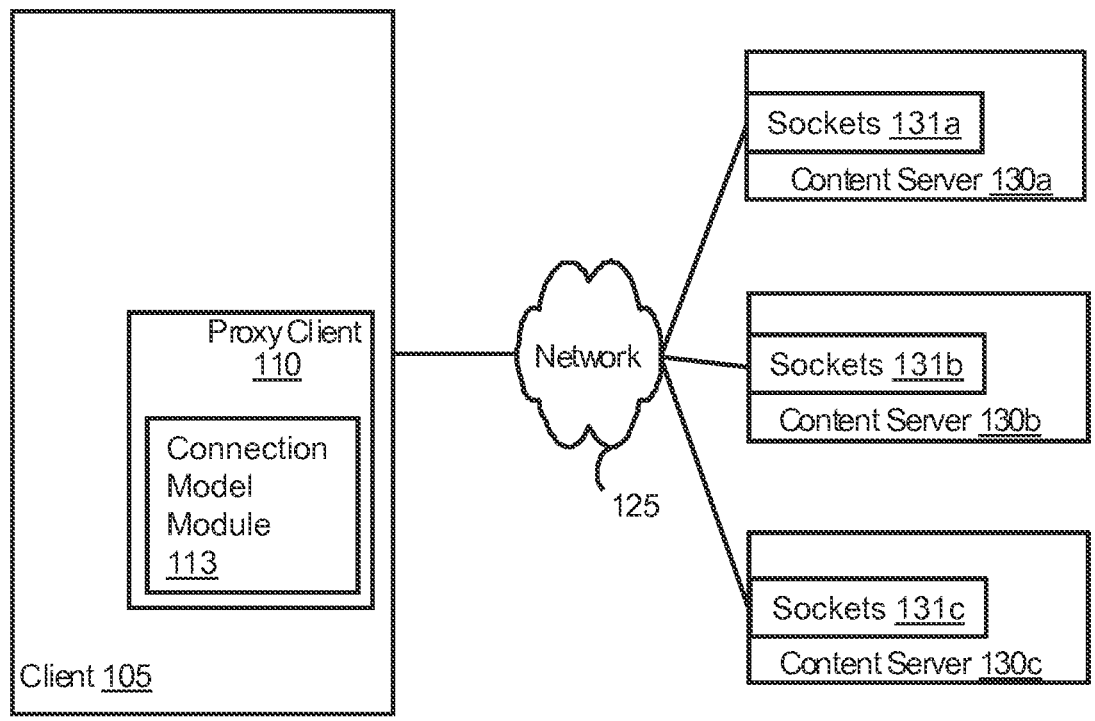
FIG. 1A illustrates a block diagram of one potential implementation of a communications system in accordance with one potential embodiment of the innovations presented herein.

Embodiments relate in general to network acceleration and, more particularly, to optimizing web page transactions and web page load operations with TCP connection modeling and aggregation. In certain embodiments, information from a web page transaction model in conjunction with dynamic connection models are used to more efficiently download content and render a page by optimizing the use of available connections. This information from the web page transaction model may be used with information from connection models to allocate large files or serializers (blocking objects) to faster connections, or to schedule lower priority files to be downloaded later. Additionally, a system may decide to download a small file before a larger file on a given connection because by doing this a system will reduce the overall number of round trips to download both files, given the exponentially increasing nature of the speed of a connection with more data downloaded over it. The pool of connections may be for a single given content server, or for a pool of connections from multiple content servers or IP addresses associated with a single content server. In general, prior knowledge about the web page and the objects on it can be used to provide meta information (file size, server processing time, inter-object dependency, and object priority based on impact on page load) that, in conjunction with a dynamic model of each connection, enables a more efficient scheduling of object downloads in order to minimize the time required to download the objects and render the web page.

In one potential implementation, a user of a client-side computer clicks on a web page link. The client-side computer or a web browser operating on a client-side computer may then send an HTTP request to a proxy that manages the web page transaction for the link, including TCP connection modeling and aggregation. The proxy will then open a plurality of TCP connections and send an initial HTTP request to a host content server that contains at least some of the objects necessary to render the web page in response to the click. The process of opening the plurality of TCP connections may provide initial information for modeling each connection. The content server then sends an initial or root HTTP response back to the client-side computer via the proxy. The initial HTTP response will include embedded URLs that need to be requested by the client in order to render the web page. The models of the open connections are then used to identify the connections likely to be the fastest. The objects from the embedded URLs are requested over the open connections modeled to be the fastest connections. The models are updated over time as additional objects are received, and any follow up or child URLs identified in objects are then requested using connections identified by TCP connection modeling to provide the fastest download of the objects. After all objects necessary for the web page have been received at the client-side computer, the web page is rendered.

As described herein, different embodiments may use different methods for optimizing rendering time using TCP connection models such as identifying fast connections, identifying stalled connections, and allocating object requests among connections based on the modeled connection speed and predictions for future speeds of the connections in the pool. While various aspects and descriptive example embodiments are discussed above and throughout the present application, the following detailed description illustrates embodiments in further detail to enable one of skill in the art to practice the invention. In the following description, for the purposes of explanation, numerous specific details are set forth in order to provide an understanding of the present invention. It will be apparent, however, to one skilled in the art that the present invention may be practiced without some of these specific details. In other instances, structures and devices that are non-limiting examples of embodiments are shown in block diagram form as illustrations. Several embodiments of the invention are described below, and, while various features are ascribed to different embodiments, it should be appreciated that the features described with respect to one embodiment may be incorporated with another embodiment as well. By the same token, however, no single feature or features of any described embodiment should be considered essential to the invention as other embodiments of the invention may omit such features.

Referring now to FIG. 1A, one potential embodiment system for providing network acceleration is illustrated. In the embodiment of FIG. 1A, client 105 may be a user system that operates a web browser application, and may generate a request for content from one or more of content servers 130 using network 125. As shown in FIG. 1A, client 105 may include a proxy client 110. Proxy client 110 may essentially intercept or receive HTTP requests from a web browser of client 105 in a way that is transparent to a system user. In alternative embodiments, proxy client 110 may be implemented as a separate device that may function as a proxy for one client or multiple client systems such as client 105.

Proxy client 110 includes connection model module 113. The connection model module 113 may identify and store data for particular connections with content servers 130.

This data may include latency, download speed, download speed ramp time, and other characteristics of the connection or server that impact the time for an object requested from a particular content server 130 to be received by client 105.

As shown by FIG. 1A, each content server 130a-c includes sockets 131a-c. A network socket is an endpoint of communication flow and may function as a communication endpoint managed by software on a computing device. For TCP/IP connections, a socket is assigned an address which is a combination of an IP address and a port number of the computing device. For example, in TCP/IP embodiments, content server 130a may listen at a port for an initial communication. When a connection request from client 105 is received at content server 130a, content server 130a may acknowledge the request from client 105 with a communication to client 105. Then, client 105 may respond to content server 130's acknowledgement to establish a connection at one of the plurality of sockets 131a. The socket identifier functions as a unique identifier that enables communications to be sent to a specific socket on a specific server. This socket identifier may also be used as a tracking identifier to store data regarding connection performance as part of a connection model. While one potential connection is described above, any connection oriented communication may utilize aspects of embodiments described herein.

Figure 1B:
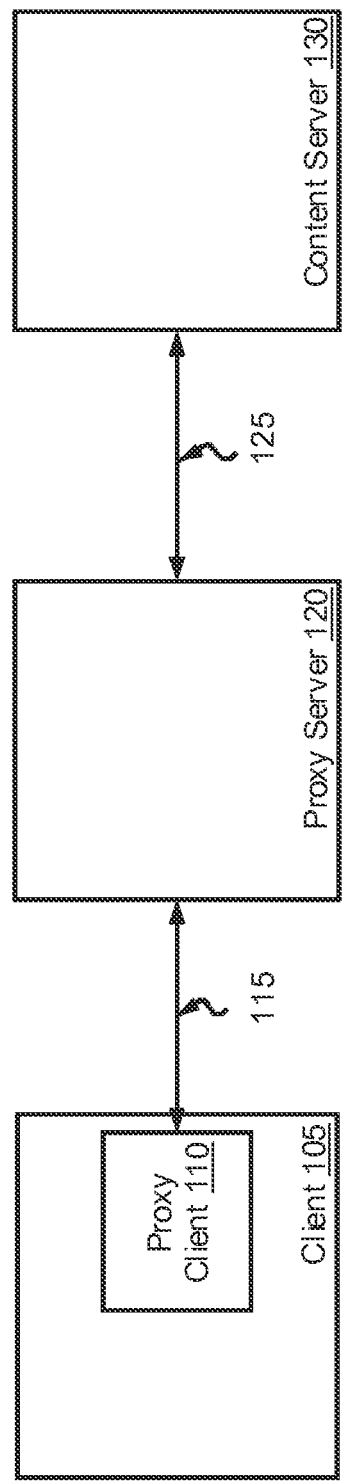
FIG. 1B illustrates a block diagram of one potential implementation of a communications system in accordance with one potential embodiment of the innovations presented herein.

FIG. 1B describes an alternate system in which embodiments may function. FIG. 1B includes client 105, proxy client 110, proxy server 120, and content server 130. Proxy client 110 may be configured to intercept the content request from client 105 and transmit the request over network 115 to proxy server 120 on behalf of client 105. In certain embodiments, network 115 may comprise a high latency link. In one embodiment, network 115 may be a satellite link, a cellular link, a wireless link, etc. In one embodiment, the content request may include references to prefetchable content. Accordingly, proxy server 120, while prefetching objects for network acceleration, may utilize prefetch systems and methods in addition to connection modeling and network acceleration according to certain embodiments.

Figure 1C:
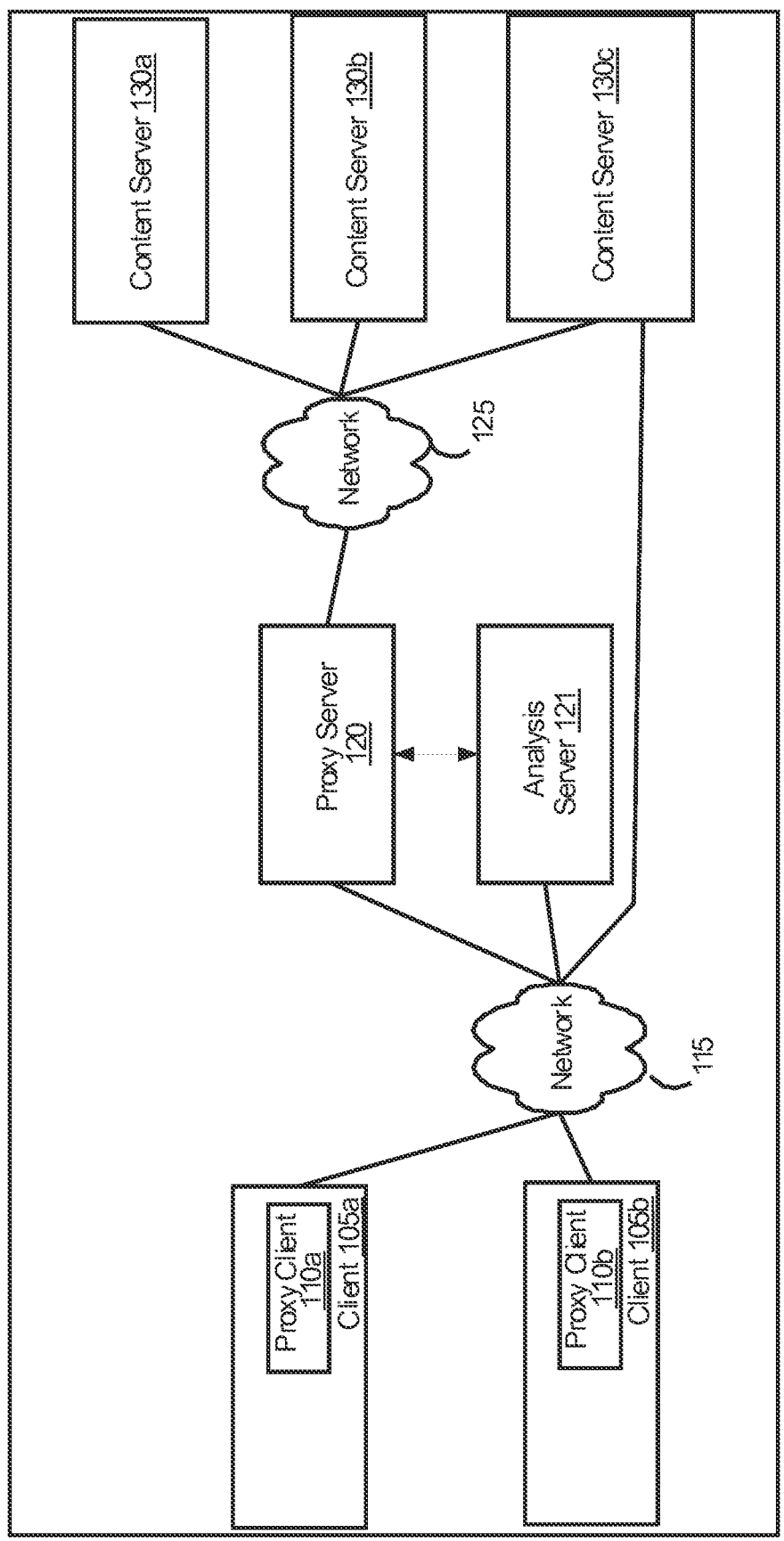
FIG. 1C illustrates a block diagram of one potential implementation of a communications system in accordance with one potential embodiment of the innovations presented herein.

In such embodiments, proxy server 120 may include systems for modeling connections and for optimizing web page transactions using the connection models to accelerate communications between proxy server 120 and content server 130. Some embodiments may function in systems with multiple proxy servers. In any of the embodiments described below, a system may include multiples of any component, for example, multiple clients such as clients 105a,b, multiple proxy servers such as proxy server 120, and multiple content servers such as content servers 130a-c, as shown in FIG. 1C described further below. In certain embodiments, proxy servers may share information, such that web transaction analysis and connection modeling performed on proxy server 120 may be communicated to another proxy server. This may be done, for example, to improve the quality and amount of real user data for each proxy server that may be used to analyze web transactions and improve prefetch decision making. In other alternative embodiments, proxy servers may be organized into groups, such that certain groups share user data, and certain other groups of proxy servers do not share user data. Such sharing may be based on privacy access rights, user groupings, proxy server service provider information, or any other grouping scheme. In further embodiments, a browser plug-in or browser integrated module may perform the functions of a proxy client 110 or proxy server 120 for any function described herein.

FIG. 1C describes an additional alternative embodiment where user data, web page transaction data, socket connection performance data, or other data may be analyzed using a separate analysis server 121. In certain embodiments, a proxy server such as proxy server 120 may collect data and send it to analysis server 121, and may receive information relevant to prefetching from analysis server 121 implementing any analysis and improved method for prefetching described below. Analysis server 121 may, for example, provide proxy server 120 with a list of objects for potential prefetching and a probability of success associated with each object. As the success or failure of associated prefetching is determined, the proxy server 120 may provide information to the analysis server 121 to update models and probability calculations. This structure may include a single analysis server for a single proxy server, or analysis server for a group of proxy servers.

In a further alternative embodiment, a client such as client 105b may communicate directly with a content server such as content server 130c. In such an embodiment, proxy client 110b may serve in an interception, data collection, and prefetching role. Proxy client 110b may communicate with analysis server 121 to receive connection model data, prefetching analysis, and other assistance with information aggregated from multiple clients. Thus, although various embodiments may be described as functioning using a proxy server 120, a proxy client 110, or both, embodiments may function with a proxy client 110 fulfilling the role of observing a web page transaction, modeling web page transactions and modeling connections. This may be done as a stand-alone function on a single computing device, or may be done in conjunction with an analysis server 121 or other analysis module to perform an improved method of web page acceleration analysis that enables connection optimization and/or prefetching optimization for retrieval of web page objects from content servers.

Embodiments of the systems described herein can be implemented in a number of ways without departing from the scope of the invention. In some embodiments, as described above, a separate proxy is implemented, such that a proxy server and a proxy client are stand-alone devices. For example, a transparent intercept proxy can be used to intercept traffic in a way that is substantially transparent to users at the client side of the proxy tunnel. In other embodiments, the optimizer is implemented as an in-line optimizer. For example, the client proxy is implemented within a user terminal and the server proxy is implemented within a provider terminal (e.g., a satellite base station or gateway, a cable head-end, a digital subscriber line access multiplexer (DSLAM), etc.). Other configurations are possible in other embodiments. For example, embodiments of the proxy server are implemented in the Internet cloud (e.g., on commercial network leased server space). Embodiments of the proxy client may be implemented within a user's personal computer, within a user's modem, in a physically separate component at the customer premises, etc.

As used herein, a "connection" refers to any communication session or extended coupling that is established between two computing devices prior to content data being transferred, and where a stream of data is delivered using the connection during a session. Such connections may be considered virtual connections that are established using software protocols to establish and terminate the coupling between the two computing devices as part of a connection. While many embodiments may be described in the context of TCP/IP connections using associated sockets as described above, any communication system that uses connections may function according to various embodiments.

As used herein a "connection model" refers to a model, data structure, analysis system or any such construct that may be used to analyze the performance of a connection and predict future performance of the connection. In certain embodiments, a connection model with store information related to both latency and bandwidth or download speed. Certain models may additionally keep a history of stall performance, where a certain connection hangs or stops operating. A connection model may further associate a unique identifier with a connection. For example, a connection model for a TCP/IP connection may include a measured latency, a measure of recent download speeds on the connection, an expected ramp time, and a unique identifier comprising the IP address and port number that uniquely identifies the socket at the content side of the connection. In other embodiments, any additional information may be stored as part of a connection model that may further be used to predict performance. For example, a record of transitions from exponential growth during slow start to linear growth after a slowstart phase may be part of a connection model, and may be used to anticipate future download rates over the connection. Any number of possible models may be used, including Markov chain models, fluid models, latency models, or any other such models for predicting TCP connection behavior over time factoring in data transferred and packet loss. The model may incorporate the measured round trip time to the content server. It may also incorporate the instantaneous bandwidth measurement arrived at by dividing the bytes that arrive together—corresponding to one TCP send window of data—by the measured round trip time. This instantaneous bandwidth can be used as an initial condition in a model that will predict future bandwidths for the connection and that then allow accurate estimation of time required to transfer a file of a given size over the connection.

References herein to "intercepting" data should be construed broadly to include any useful slowing, sampling, re-routing, and/or other techniques that allow processing of the data as required according to various embodiments. In some embodiments, traffic passes through the proxy server, where it is "intercepted" by being buffered for analysis and processing. For example, the buffering may be used to slow and accumulate traffic for analysis, as described more fully below. Notably, certain embodiments described as using a component or module to intercept the traffic may actually be implemented by having a different component intercept the traffic, from which web page analysis module may receive the intercepted traffic for processing.

A "root" refers to an initial portion of a web page transaction that is initiated directly by a user selection or action. For example, a user clicking on a web page link initiates a root HTTP request for that link. The root HTTP response is the response directly responding to that root request.

"Child" requests and responses are then follow-on requests and responses that result from embedded or calculated references to objects in root objects. The child objects, requests, and responses are always one or more steps removed from the user action by a root that directly responds to the user action.

Additionally, while certain embodiments include intercepting as described above, certain other embodiments may function without such intercepting. For example, in one potential non-limiting embodiment, a browser or module within a client may create and send reports detailing user data without the system requiring redirection or interception of any data. Thus, any embodiment described herein may have associated alternative embodiments without interception or with interception essentially occurring within a web browser or a web browser plug-in.

As used herein, "content servers" is intended broadly to include any source of content in which the users may be interested. For example, a content server 130 may provide website content, television content, file sharing, multimedia serving, voice-over-Internet-protocol (VoIP) handling, and/or any other useful content. It is worth noting that, in some embodiments, the content servers 130 are in direct communication with the proxy servers 120 (e.g., not through the network 125). For example, the proxy server 120 of FIG. 1 may be located in a gateway that includes a content or application server. As such, discussions of embodiments herein with respect to communications with content servers 130 over the network 125 are intended only to be illustrative and should not be construed as limiting.

In some embodiments, when the client 105 communicates with the content server 130, the proxy server 120 intercepts the communications for one or more purposes. As described below, the proxy server 120 may be part of a server system that includes components for server-side communications (e.g., base stations, gateways, satellite modem termination systems (SMTSs), digital subscriber line access multiplexers (DSLAMs)). The proxy server 120 may act as a transparent and/or intercepting proxy. For example, the proxy client 110 is in communication with the proxy server 120 over a client-server communication link 115, and the proxy server 120 is in communication with the content server 130 over a content network link 125. The proxy server 120 may act as a transparent man-in-the-middle to intercept the data as it passes between the client-server communication link 115 and the content network link 125. Some purposes of the interception may include filtering, caching, parsing, and/or otherwise processing the requests and responses. For example, when the client system 105 requests a web object from a content server 130, the proxy server 120 may intercept and parse the request to implement prefetching and/or other types of functionality in a way that is completely transparent to both the client 105 and the content server 130.

In addition to the connection models described above in FIGS. 1A-1C, additional network connection models may be supported in certain embodiments. For example, one embodiment may include a peer-to-peer communication connection. In such an embodiment, communications may occur between clients such as client 105a and client 105b of FIG. 1C. In such embodiments, proxy server 120 and analysis server 121 may enable and assist with optimization of peer-to-peer communications between these client devices similarly to a communication between a client and a content server, but with a client acting in place of the content server.

In still further embodiments, rather than the communication being between a client and a particular physical server device, the communication may be between a client and a virtual content server which is implemented as part of a group of server devices providing communications to clients using a virtual content server configuration to provide access to applications and content. In such embodiments, a proxy server and/or analysis server may also serve a similar function to the one described in various embodiments here, with acceleration and optimization provided for communications between the client devices and the virtual servers hosted on groups of server devices.

Figure 2:
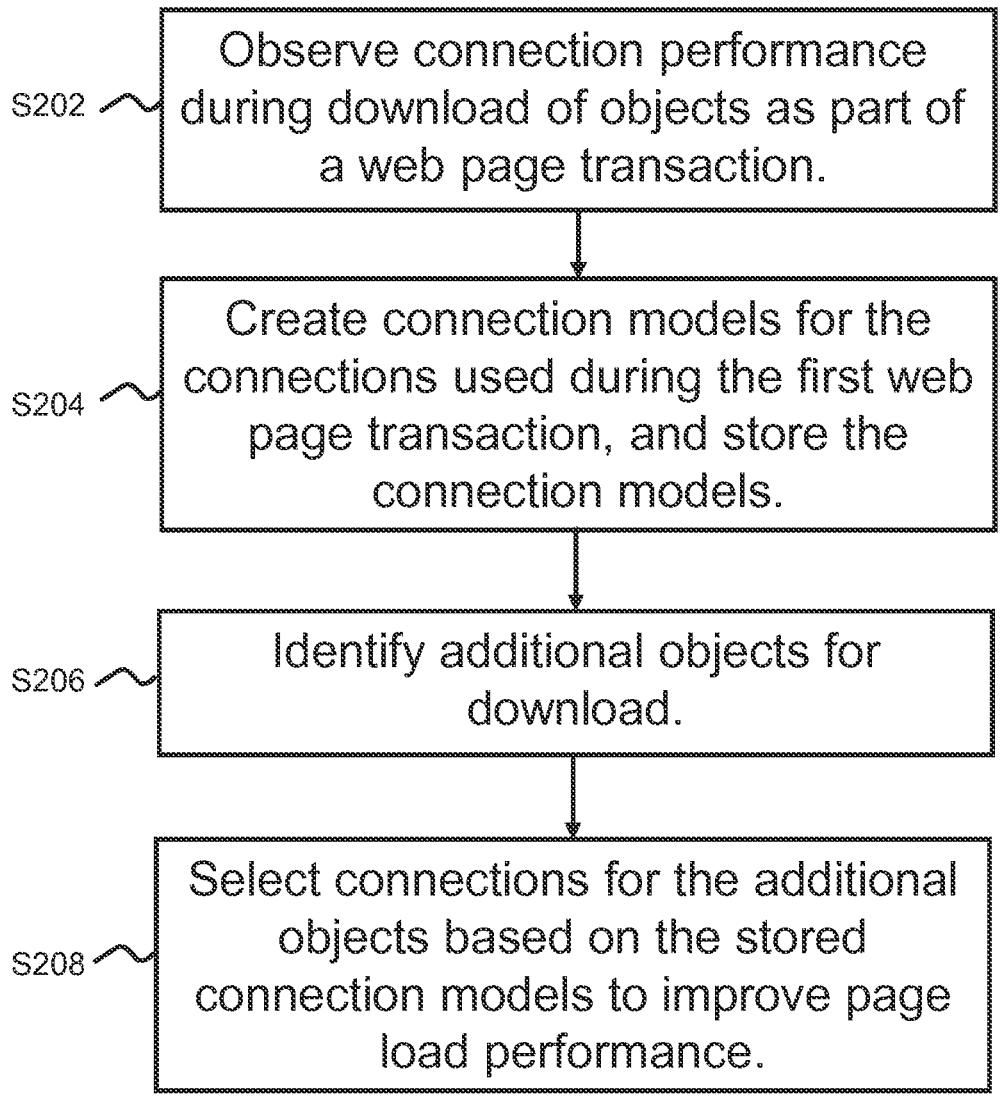
FIG. 2 is a flowchart describing one potential method of improved web page loading in accordance with the innovations presented herein.

FIG. 2, then, describes one potential method of accelerating web performance according to an embodiment. In S202, a connection performance during download of objects is observed as part of a web page transaction. This observation may be done by a web browser plug in, a proxy client, a proxy server, or any module capable of making measurements related to connection performance. In S204, connection models are created or updated for the connections used as part of the web page transaction. The connection models are stored in a system for use in predicting future performance of the connections.

In S206, additional objects are identified for download. In certain embodiments, these objects are part of the same web page transaction from S202. Thus, models may be created and updated based on the root object and initial objects in a web page transaction. Later objects for the same web page transaction may be optimized using connection performance data from the first objects of the web page transaction. In alternate embodiments, the additional objects for download may be part of a separate web page transaction to the same host content server using the same ports or sockets as used by the first webpage transaction. In such embodiments, the model will take into account any impact of time delay or disconnect from the socket in modeling expected performance from the connection model associated with that socket.

In S208, connections are selected from among available connections for use in downloading the additional objects. This selection is based on the connection models, and is made to optimize page load performance. In other words, the connections are selected to minimize the time from selection of the root object by a user and final rendering of the complete web page selected by the user. In certain embodiments, then, S202, S204, and S208 may occur repeatedly, simultaneous or near-simultaneously within a given time period, or in any such combination to optimize transfer of content. The selection of connections to optimize page load performance may be done in a variety of ways using multiple tools, such as matching larger files to faster connections, splitting large files among multiple connections, reusing fast connections when they become available, restarting stalled objects, and so on. Additional details and embodiments are described below.

As mentioned above, in certain embodiments, a system for modeling connections and accelerating web transactions may further be integrated with a prefetching system. A system for modeling connections may provide additional value in a system with prefetching since a prefetching system may have a greater number of objects to download from a particular server at one time, as one of the purposes of a prefetching system is to reduce the serial nature of certain web page transactions and increase the parallel downloads of objects during web page transactions.

Figure 3:
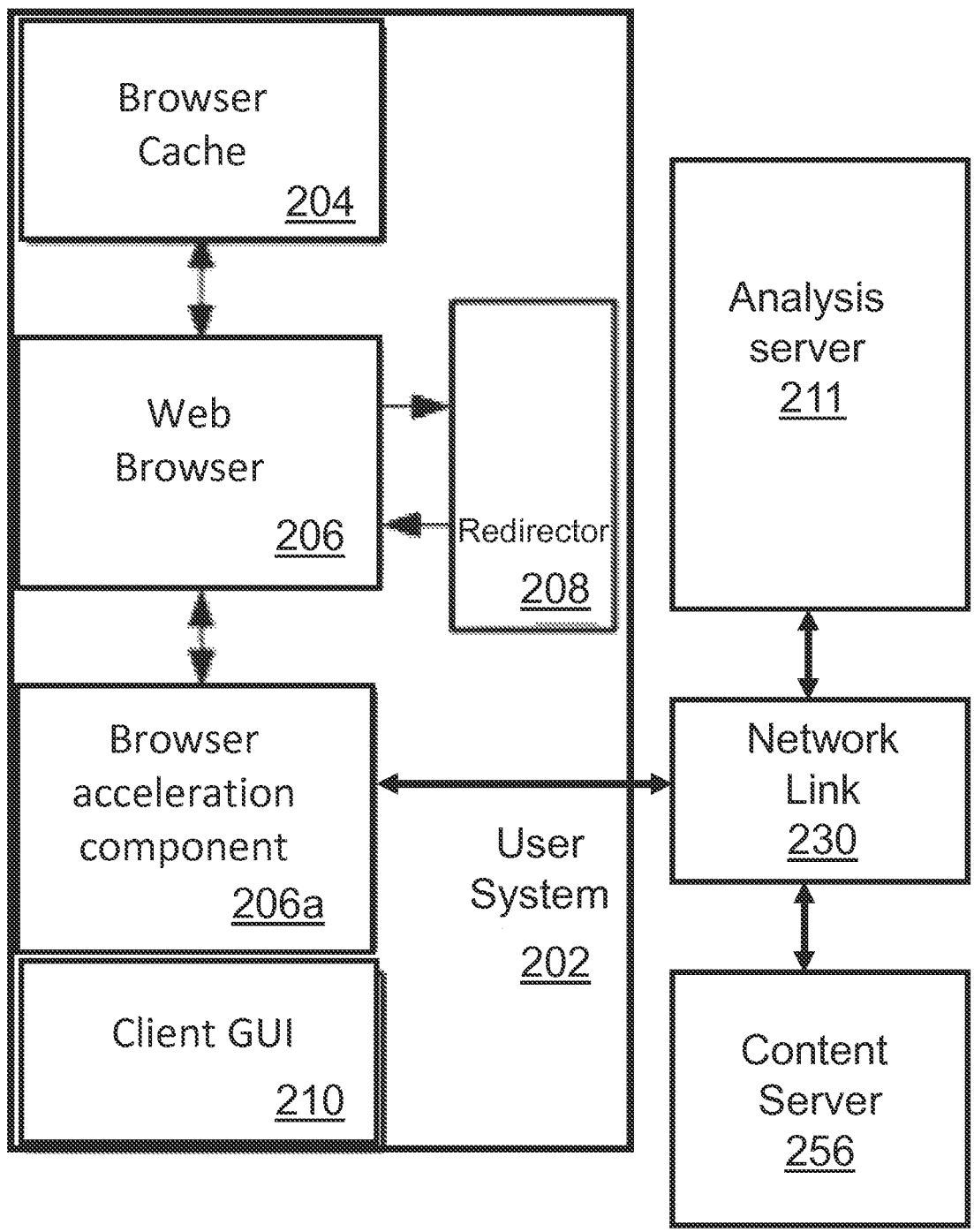
FIG. 3 illustrates a block diagram of one potential implementation of a communications system in accordance with one potential embodiment of the innovations presented herein.
Figure 13:
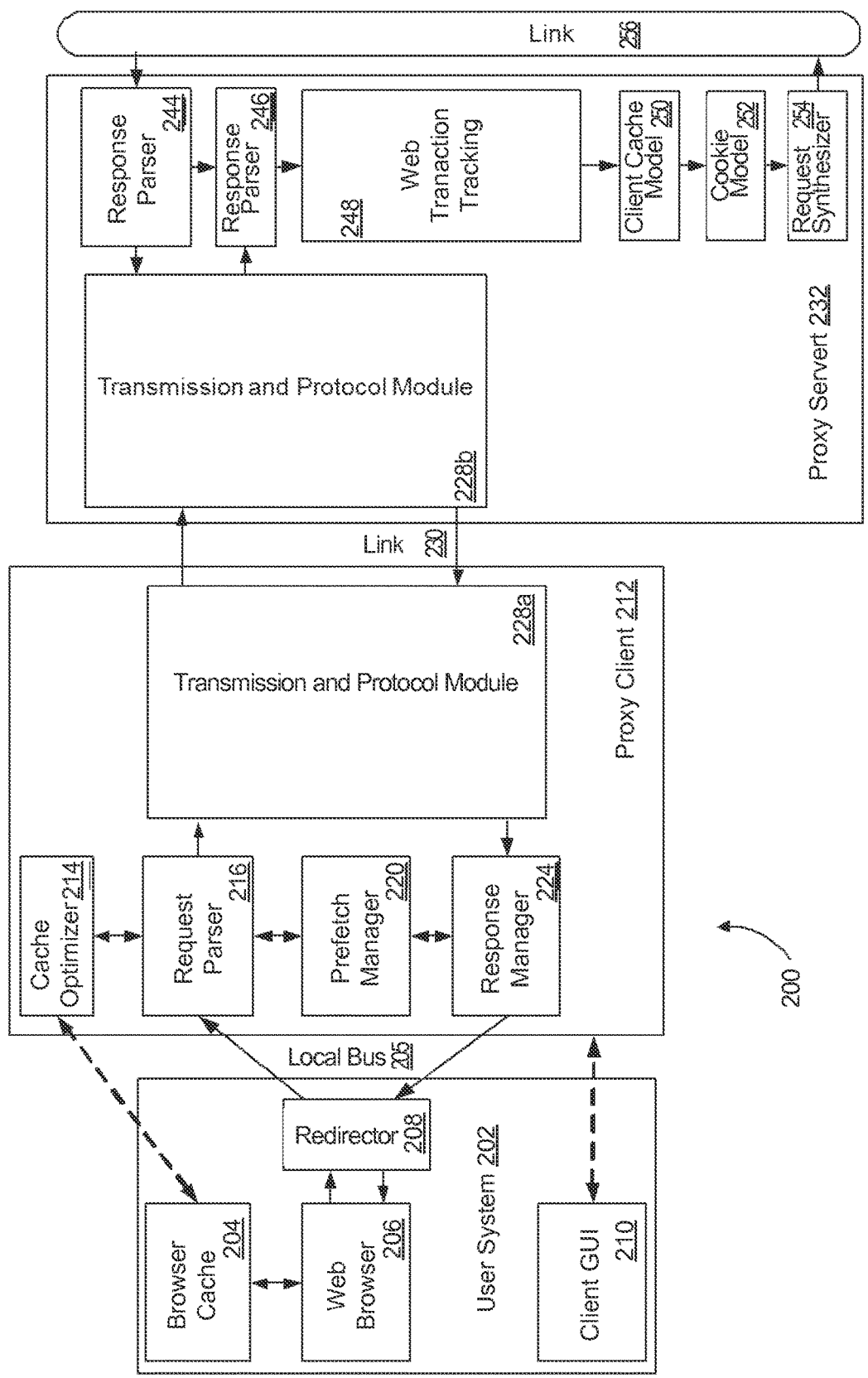
FIG. 13 illustrates a block diagram of one potential implementation of a communications system in accordance with one potential embodiment of the innovations presented herein.

Turning now to FIG. 3, a system is shown that may be used as part of a system for acceleration of web content from the Internet to a web browser is illustrated. System 200 may be, for example, an embodiment of a system as shown in FIG. 13 including a proxy client 212 and a proxy server 232. Similarly, the client system of FIG. 3 may be one potential embodiment of a simple client and content server system as shown in FIG. 1A.

FIG. 3 describes an embodiment of a user system 202 which includes a browser acceleration component 206a. Browser acceleration component 206a may function to gather information associated with a complete web page transaction and web page rendering from inside web browser operation. For example, browser acceleration component 206a may analyze web transactions from inside the web browser, and may provide feedback to an analysis system that provides improved network connection performance, prefetching, and acceleration for future web page transactions. Analysis server 211 may, for example, function as an equivalent to analysis server 121 from FIG. 1C, such that the embodiments of FIG. 1C may additionally include feedback to a proxy server or analysis server from the client in any of the various embodiments described herein.

Embodiments of user system 202 may thus function in systems for improving web performance. For example, browser acceleration component 206a of FIG. 3 may observe a first root HTTP request from a client to a content server and a subsequent root HTTP response from the content server to the client. The browser acceleration component 206a may then communicate with an analysis server 211 to receive hint information or any prefetching assistance which describes expected objects and dependencies among the objects for the web page transaction initiated by the first root HTTP request. The browser acceleration component 206a may also measure initial performance of connections opened with a content server 256 to identify fast and slow connections. Hint or prefetching assistance information may influence the number of connections opened from user system 202 to content server 256 via network link 230. Browser acceleration component 206a may also scan the first HTTP request and the subsequent HTTP response or execute portions of the associated code to identify parameters which may be necessary to identify certain objects as part of the web page transaction. All this information may then be used by browser acceleration component 206a to select objects to request from content server 256 and to select which connections to use for each object. In certain embodiments, because the browser acceleration component 206a is directly observing the code of the web page transaction, the correlation may be significantly higher than any correlation identified by a proxy server. The correlation is functioning as an error check in such systems rather than a means for inferring the code since, in certain embodiments, the browser component has the actual executed code that may be accessed directly.

Thus, various embodiments may improve caching according to the above described methods. An additional alternative embodiment may use any suitable a system or device and function by observing, using a computing device, a web transaction including a root HTTP request and a plurality of child HTTP requests and responses. The system may then record a set of timing information for the web page transaction, calculate an expected page load time impact associated with caching the at least one child object. The system may make caching adjustments by adjusting a caching priority for the at least one child object or by making a caching decision directly based on the calculated impact.

In various embodiments, the system may include multiple computing devices, and in certain embodiments, calculation of an impact made for a first user computer may be generalized to a second user computer, such that caching decisions may be made on a second computer using an impact calculated for a first user computer. In further additional embodiments, the cache may be remote from a user computer, or may be shared cache. The impact may be made based on characteristics of a system element such as a dynamic CDN, where the cache is the dynamic CDN and the page load impact is calculated based on the impact of storing an object in the dynamic CDN/cache. Further embodiments may compare the impact of storing an object in local cache versus a remote cache such as a dynamic CDN.

An impact may be determined in a number of different ways. In certain embodiments, a record of page load frequency for users may be determined based on user history data. This data may be used to predict a future page load frequency. For example, if a user regularly loads a news page daily, the system may infer that the page will be loaded daily. Additional patters such as week-end usage or monthly usage may additionally be found to set specific caching times and to cache objects during peak probability of use in conjunction with the additional impact calculations based on page load time.

An impact may alternately be determined by using a web crawler or server that automatically analyzes server responsiveness and other web transaction data along with known data related to users to model page load impact time without directly observing a page load for a user. Further embodiments may function by communicating the timing information from the computing device to an internet optimization server, wherein the calculating of the expected page load time impact is performed on the internet optimization server, or the calculation may be done on a client proxy or a browser plug-in module. In various embodiments the set of timing information includes an overall page load time from user selection to complete web page rendering. For systems using a browser module, the module may directly determine when a user selection is made within the browser for the purposes of determining page load timing. This page load timing may then be used in the creation of transaction models which may further be used by a system for allocating objects to connections using connection models during a web page transaction.

Additionally, in various embodiments, the page load time may impact more than one user. Especially in the case of a shared or remote cache, the impact may be the sum of the impact for each user over a given period of time. The caching priority may therefore be set in a situation where although the impact for a single user may be small or negative, the overall impact for a group of shared users may be large. For example, an impact may be different in a situation where server responsiveness is fast and the bandwidth of users varies widely, but the impact may be similar for users if a server response time is slow compared to the file size and bandwidth of the users.

Just as for the multiple various embodiments described above, any particular component or step of the above describe example is non-limiting and may be altered, performed independently, or combined with any other known or described step that allows the system to function. In certain embodiments, an input URL and associated dynamic response data are analyzed for nested or dependent relationships. These relationships may be between children of a root HTTP request or may be reliant on further input. In further embodiments, a prefetching system identifies how information from a prefetch response or a subsequent web application request during a page download may be used to synthesize dynamic fields in a child URL. The above description therefore includes many potential combinations of systems, apparatus, and methods of using real user usage data to determine the dependency structures of a web application.

Browser feedback also provides perfect root object identification. Browser feedback may also indicate which web control on the page was used to initiate the root object. So, for instance, browser feedback can indicate that the user clicked the "Search" or the "Submit" button to initiate the root object request. Similarly, browser feedback may indicate if the user clicked a link in an HTML header or an HTML footer. This type of click context information enables smarter root identification and creation of more accurate web page models including root models or templates which is where the acceleration system is able to identify child objects to prefetch for a give root object URL despite the fact that the exact root URL has never been seen before in the system.

The browser feedback described above can benefit both a proxied accelerator system as well as a web browser based acceleration systems that includes a component inside the browser to perform prefetching. In general, browser-based feedback improves performance and efficiency as more objects are successfully prefetched with fewer extra objects downloaded that are not requested by the browser. Additional improvements may be seen when the web browser component not only provides feedback but also functions inside the browser to assist in the prefetching process itself. In such embodiments, the components such as browser acceleration component 206a functions both to provide feedback to an acceleration system also to improve the prefetching for objects in a web page transaction being currently executed by the web browser. The browser acceleration component 206a may do this while also creating and storing connection models and performing object allocation to connections as described herein.

By processing data that describes past visits to pages on the web, including detailed timing information required to transfer each object on each web page on the Internet, the analysis server 211 can provide predictions for the following characteristics of each object needed to render a given web page: size of the object, the amount of time the content server will require to generate the object (content server processing time), interdependencies between objects indicating which objects need to be downloaded before which other objects in order for the page to render properly, and finally, priority of the objects on the page, where priority is an indication of the impact that downloading the object quickly will have on the overall time required to load and render the page. The browser acceleration component 206*a* uses this information retrieved from the analysis server 211 to optimize the subsequent download of the objects embedded in a web page. It not only learns which objects to prefetch but also how to optimize the download of those objects given a pool of connections established to the content server 256.

Additionally, by processing data that describes past visits to pages on the web, the analysis server can provide predictions on characteristics that describe content servers associated with a given host name. For instance, the analysis server can identify when a given IP address associated with the host name is non-responsive. Or, further, it can identify which IP address associated with a host name has the lowest latency for user in a given region. This information can be used to optimize the connection pool and the time required to download the objects needed to the render the page.

Additionally, by processing data that describes past visits to pages on the web, including detailed timing information required to transfer each object on each web page on the Internet, the analysis server can provide information about HTTP functionality supported by the content servers. For instance, the analysis server may have information about a specific content server identifying whether the content server has certain functionality. For example, the analysis server may have information identifying if the content server supports HTTP 1.1 pipelining or if it supports SPDY. The analysis server may also identify whether a content server may enforce a limit on the number of concurrent connections that can be established to it from a given browser. Each of these bits of information can be used to optimize subsequent attempts to download objects from the server and render web pages. If pipelining or SPDY are supported, then the pool of connections used to download objects from that server can use these features. If there is a limit enforced, then the browser acceleration component 206*a* will limit the size of its pool to the limit predicted by the information received from the analysis server. When a web browser 206 is involved with a request for information that is initiated using a client graphic user interface 210 to request the information from a content server 256, then the browser cache 204, browser acceleration component 206*a*, and redirector 208 may function to communicate with both analysis server 211 and content server 256 via network link 230 to retrieve the information.

Figure 4A:
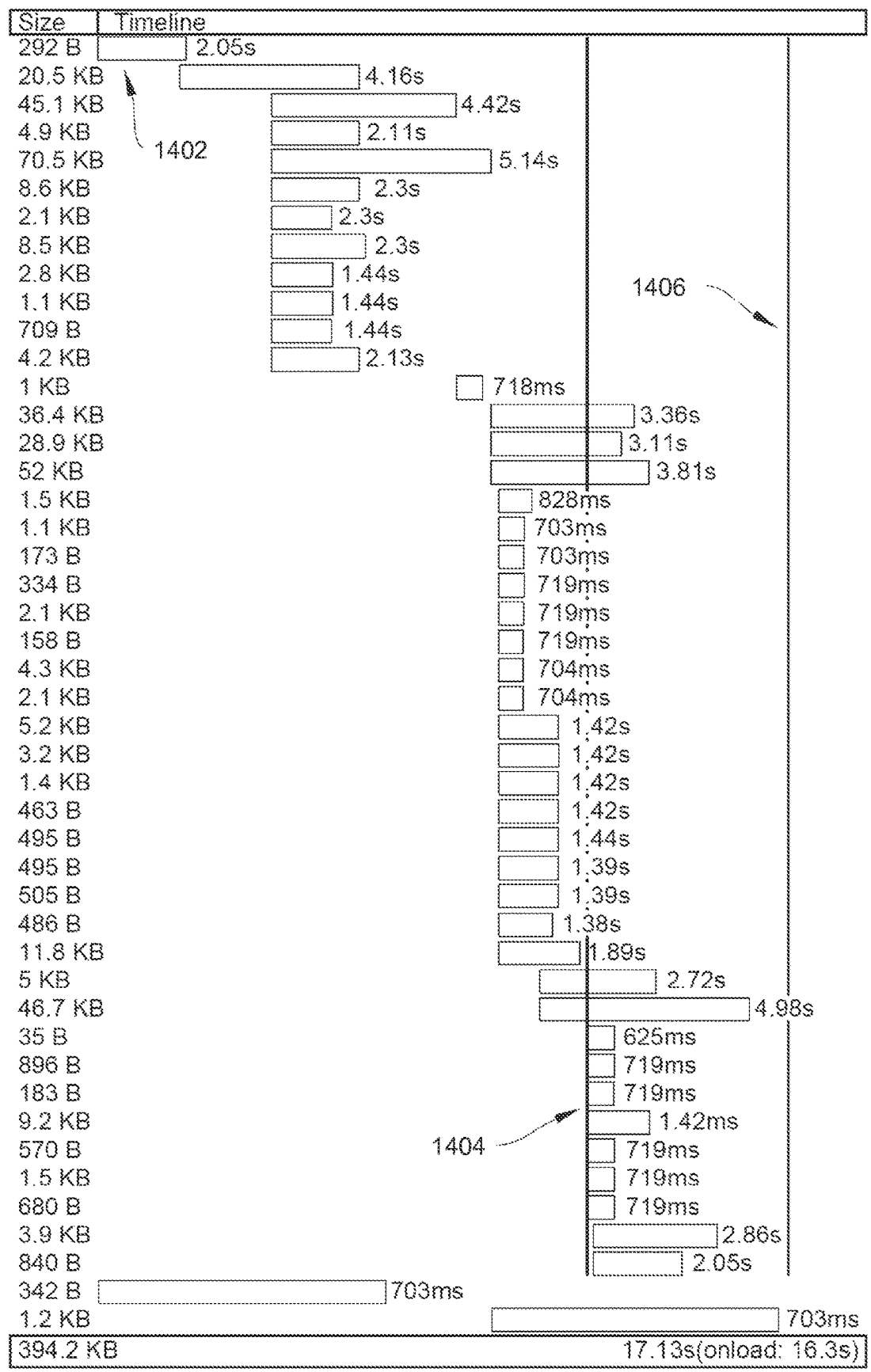
FIG. 4A illustrates one example of web page load data for use with a system in accordance with the present innovations.

FIG. 4A shows a timing chart for one potential real world example of a web page transaction that may be analyzed and accelerated in accordance with embodiments of the present innovations. The chart shows a list of objects, with a total timing and size at the bottom, and a position during the entire transaction when each object has an associated request and response. The root HTTP request of FIG. 4A is labeled as root 1402, with a 292 B size and a 2.05 second request/response time that begins at the very beginning of the web page transaction. The web page transaction includes a number of child HTTP requests and responses that are shown as beginning after the completion of the root HTTP response. The child requests and responses occur in several stages, with the final set of requests occurring at the time shown by the line indicated by timing 1404, and the final response ends roughly at the timing line indicated by timing 1406. At the time indicated by timing 1406, the web transaction is complete and ready for complete display to a user.

While FIG. 4A does not specifically identify different connections for different objects, objects shown as overlapping where at least a portion of the object transfer occurs at the same time are on different connections. A system having a connection model may record model entries that identify when an object is first requested, when the first bytes of an object arrive, any change in the rate at which bytes arrive, the object completion time, and the unique identifier associated with a particular connection. This enables the connection model to determine performance differences between a first connection on which the third object takes 4.42 s for 45.1 KB and a second connection on which the fifth object takes 5.14 s for 70.5 KB. The model may thus use details of the transfers on each connection to identify if the second connection is slower, or if the second connection is faster but both connections have a significant latency. The model may then use additional details, such as whether each connection was in an exponential growth phase or a constant rate phase to estimate a transfer time for a later object requested on each connection.

The TCP connection time impacts the overall performance of an individual connection. This connection time is shown in the waterfall chart of FIG. 4A. Any one of the bars associated with the transfer of an object can include a component associated with the time required to establish a new TCP connection if there is no available connection to the given content server. This connection time provides a good initial estimate of the network round trip time for a particular connection, independent of any processing at the server. Network round trip time to the content server is an important parameter in any model of the TCP throughput behavior of a given connection, so having an accurate measurement of this parameter is important. After the TCP connection is established, the browser will send an HTTP request for the object to the content server. The response to this request will arrive in one network round trip time plus the time required to process the request on the server (server processing time) after the request is sent by the browser. If the file cannot be sent in a single TCP send window, then the remainder of the file will arrive in bursts separated by one network round trip time as per FIG. 4B. These subsequent bursts allow a system to further refine the estimate of the network roundtrip time from the initial estimate-based TCP connect time alone. By subtracting this refined round trip time from the time required to download the first bytes in the response, a system can derive the "server processing time". This information can be sent to the analysis server and used to optimize subsequent downloads of this particular web object, identified by its URL.

One component of a connection model may thus be a round trip time as estimated by the connection time. In certain embodiments, a web browser may be provided multiple IP addresses for servers with large differences in round trip time when the browser requests content associated with a URL. The browser host may then open connections with multiple servers (as associated with the IP addresses) for downloading objects. Typical browser usage may choose randomly between connections on different IP addresses, or may simply allocate requests among the IP addresses in a circular list. If the round trip time is modeled, however, the system may assign object requests to specific connections having different round trip times in a way that optimizes connection usage and overall download time.

Figure 4B:
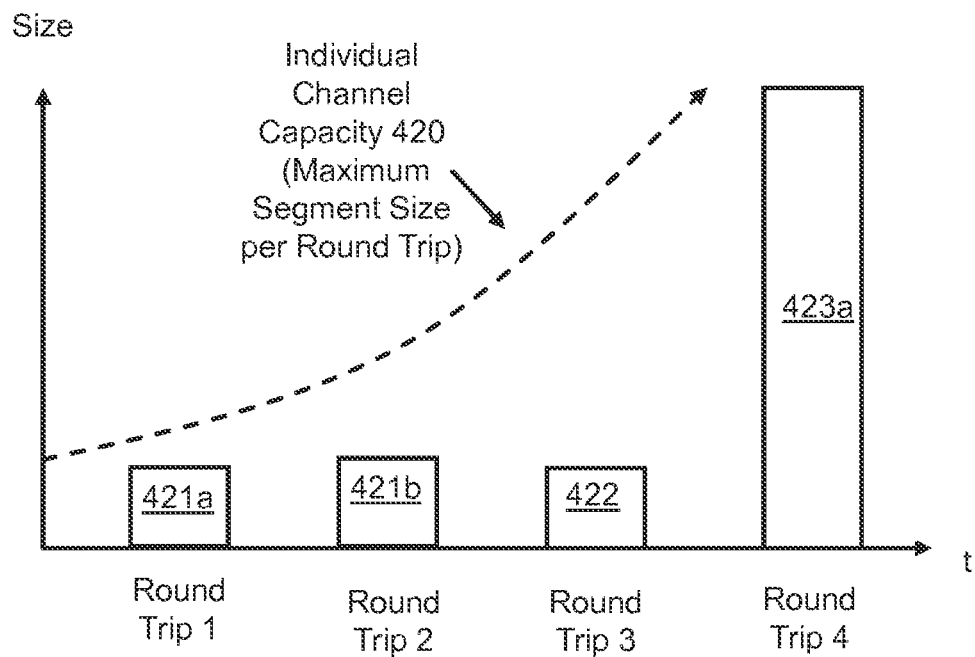
FIG. 4B illustrates one example of web page model for use with a system in accordance with the present innovations.

The waterfall chart of FIG. 4A may also be, in certain embodiments, considered a combination of round trip time information for a plurality of channels. FIG. 4B then shows a series of round trip times and the individual channel capacity 420 for a single connection. FIG. 4B shows a single channel connection with objects 421, 422, and 423 downloaded in order on the channel. Individual channel capacity 420 shows the maximum capacity of the channel at a given time for the round trip occurring at that time. Thus, as shown by FIG. 4B, a first part of object 421, shown as portion 421a, is downloaded during a first round trip, and a remaining portion 421b is downloaded during a second round trip. During round trip 3, a second object 422 is downloaded, and during a fourth round trip a first portion of an object 423, shown as portion 423a, is downloaded. Because for most TCP transactions, objects are downloaded serially, a single object request is made at a time on an individual channel. This may result in inefficiencies as shown in the difference between FIG. 4B and FIG. 4C.

Figure 4C:
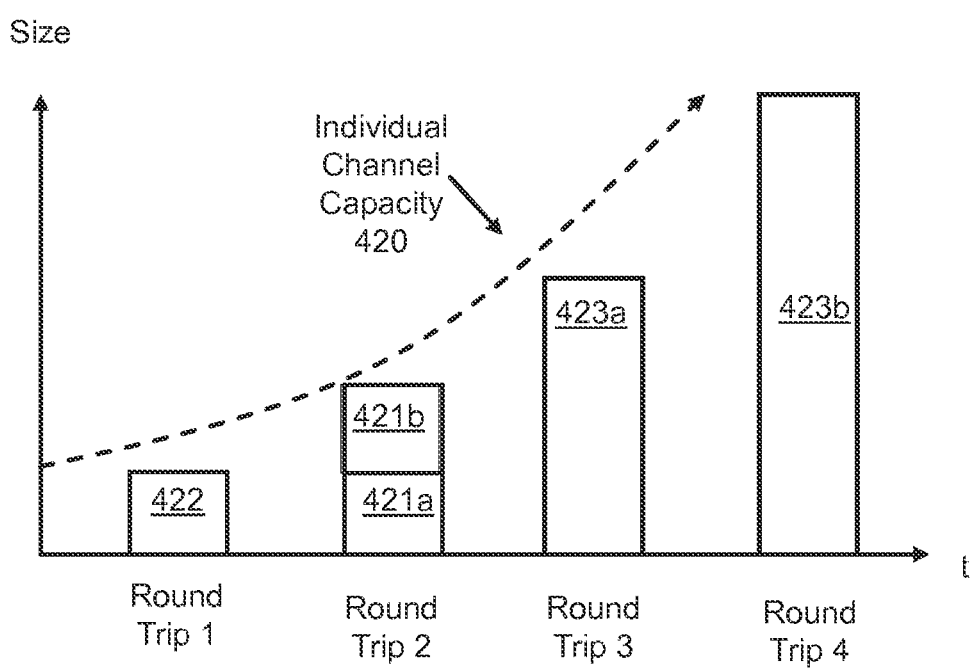
FIG. 4C illustrates one example of web page model for use with a system in accordance with the present innovations.

FIG. 4C then shows the same channel with the channel optimized by a model.

Instead of merely requesting the objects in order, the channel may identify that object 421 may be downloaded in a single round trip if it is delayed to wait for individual channel capacity 420 to increase. Thus the channel throughput may be optimized and the overall download time reduced by requesting a small object 422 in the first round trip that may be downloaded in a single round trip when the individual channel capacity 420 is small, and a larger file 421 may be downloaded in a later single round trip instead of as two portions 421a and 421b. While FIGS. 4B and 4C show an optimization on a single channel, a similar optimization may be done where multiple channels are available by assigning objects both across the channels and to different round trips within each channel to minimize the number of round trips.

Figure 4D:
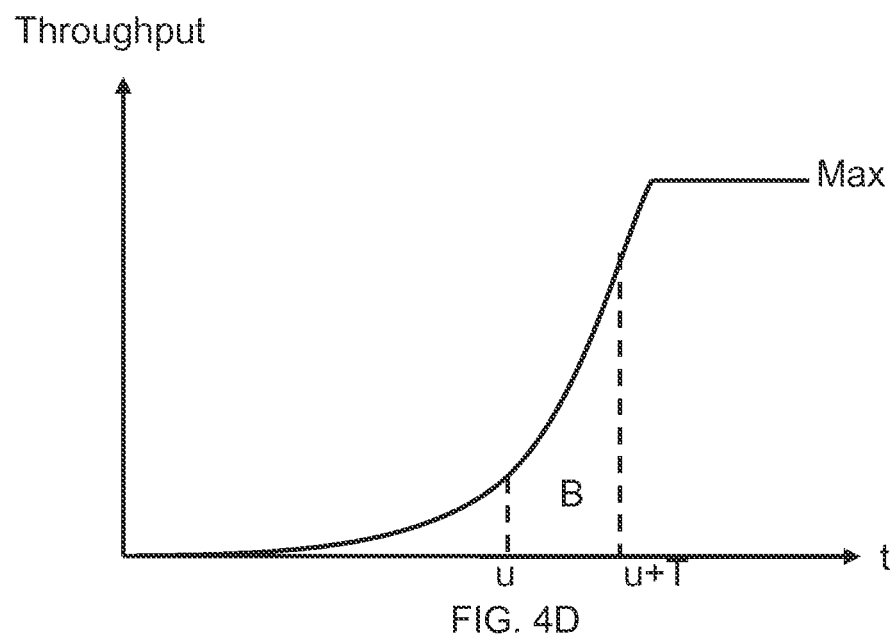
FIG. 4D illustrates one example of web page model for use with a system in accordance with the present innovations.

FIGS. 4D, 4E, 4F, and 4G provide additional detail for potential methods of modeling connections and minimizing the number of round trips. FIG. 4D shows a curve for a single large file that requires multiple round trips over time. In FIG. 4D, where B is size of the file (shown by the area under curve), u is starting state of the connection (as further detailed in 4F), and T is transfer time of the file. Because T is a monotonic increasing function of B given any u, a system can define function T=F(B; u). For M files with sizes B_m where m={1 . . . M} and N connections with starting states: u_n where n={1 . . . N}, a scheduling plan may consist of N key-value pairs S_n where n={1 . . . N}. The "key" part holds the connection, and the "value" part holds an ordered list of files. For example, S_4=(u_4, {B_2, B_1}) means that B_2 are B_1 are scheduled to transfer on connection 4 in that order.

Given S_n, a model may use Tn as the total transfer time of all files on connection n. For example, T_4 in the above example gives:

$$T\_4(S\_4)=F(B\_2;u\_4)+F(B\_1;u4+F(B\_2;u\_4)) \quad (1)$$

Therefore, overall transfer time of all files via all connections is:

$$\max\_over\_n(T\_n(S\_n)) \quad (2)$$

One potential goal of a model is to find the optimal scheduling S's that minimize the above:

$$\min\_over\_S(\max\_over\_n(T\_n(S\_n))). \quad (3)$$

Various methods may then be used to analyze the potential ordering and matching of objects with channels and download position within a channel. One potential solution may be obtained efficiently by first sorting the files by size in descending order followed by an ordering algorithm with a goal to even out the occupancy of every connection. Another potential optimization may be made by identifying small objects which may be downloaded in a single round trip at a first time but not in a second time, as described above in FIGS. 4B and 4C. Still another potential optimization may be done by identifying serializing paths within S_n and repeatedly optimizing the serializing path until additional optimizations do not reduce the rendering time for a web page.

Figure 4E:
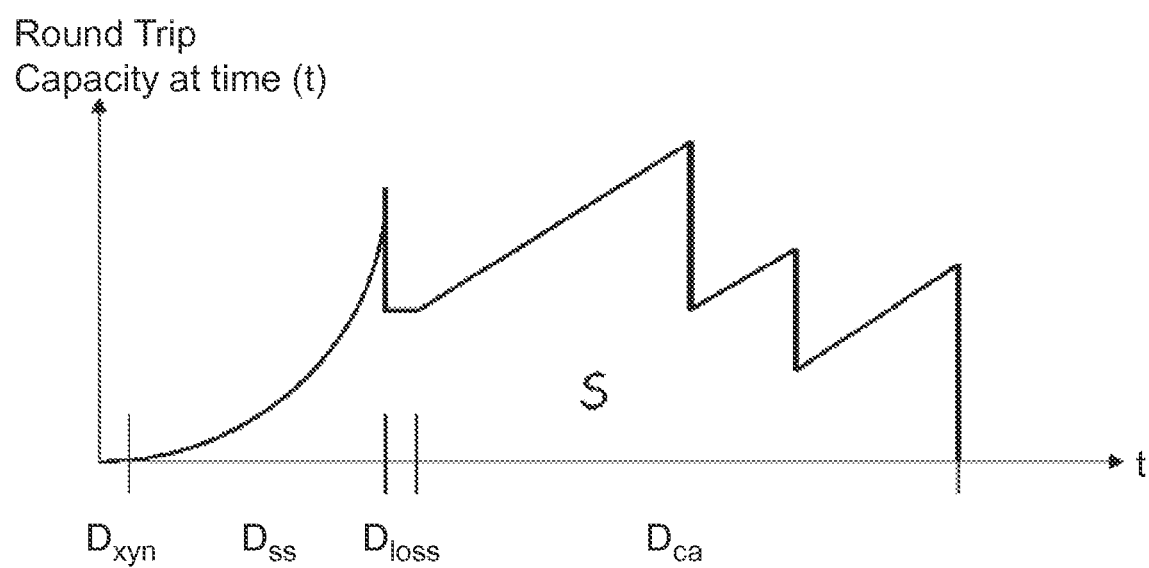
FIG. 4E illustrates one example of web page model for use with a system in accordance with the present innovations.

FIG. 4E shows one potential model for a TCP connection showing slow start (exponential increase) and then congestion avoidance phase (linear increase) which may be one potential embodiment of an individual channel capacity 420 of FIGS. 4B and 4C.

Figure 4F:
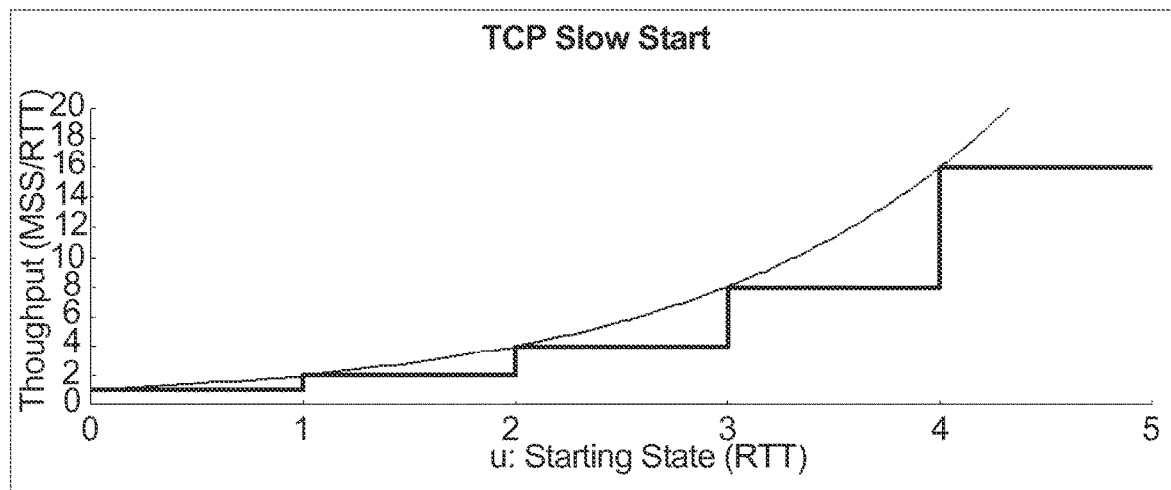
FIG. 4F illustrates one example of web page model for use with a system in accordance with the present innovations.

FIG. 4F shows additional details of a model for a connection in the TCP slow start phase described above. The throughput in this curve is in units of MSS/RTT. This graph makes the assumption that the initial TCP send window is 1 MSS and that the send window doubles with each round trip, but this is only for the purpose of an example as the throughput can be in any units and the TCP send window can have other values. Finally, the relationship between round trip time (RTT) and throughput can have other functional models. Small u is the starting state of the connection. At each round trip, a new starting state u exists with a correspondingly larger throughput. FIG. 4G thus simply again shows how throughput increases in TCP slow start, but also illustrates how this may be used in another potential model.

Figure 4G:
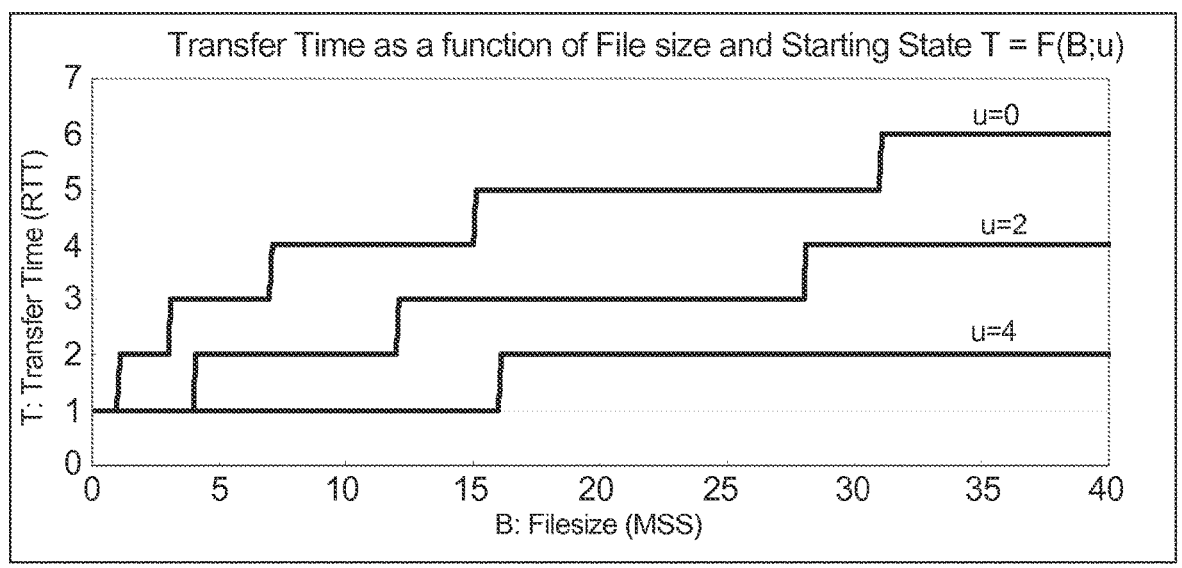
FIG. 4G illustrates one example of a web page model for use with a system in accordance with the present innovations.

FIG. 4G shows how the number of round trips required to download a single object on a single channel changes based on what the starting state is, with the starting state illustrated by FIG. 4F. If a system knows the file size and the starting state, the system may then estimate the number of round trips required to download the file. With multiple files and multiple channels, the system may then optimize downloads, not to optimize download of the single object but to optimize download of all objects required for the web page to minimize web page rendering time.

Another way of describing this optimization may be to consider T=F(B; u) the transfer time (T) of a file of size B on a connection with starting state u. Based on the above behavior, the function F(B; u) may be:

$$T=F(B;u)=\text{ceiling}(\log 2(1+B*2^-u)) \quad (4)$$

Equations 1-3 above may then be used as a scheduling plan as described above to optimize equation 3 and identify a minimum time.

In further embodiments, the above described channel capacity over time may be one part of a model for a channel. This channel capacity over time may be generated instantaneously as in the e^x model described above, or based on stored history information for a channel, IP address, or other identifier associated with a channel.

The model for a channel may then include additional components other than the channel capacity over time. For example, the round trip time may be a separate component. The round trip time may be estimated based on the connection, as described above. The round trip time may further be measured and stored in the model by any means and then used for future optimization.

Another component of a model may be a history of responsiveness of a particular server to retrieve a particular object. Server processing time is a per HTTP object metric that can be included in the information sent to the browser acceleration component by the analysis server at click time, which is the time when the user decides he/she would like to browse to a new page. The browser acceleration component uploads the click or root URL to the analysis server, which responds with a list of child objects to prefetch and characteristic data about those objects and about the content servers from which those objects will be downloaded. One piece of that data is the server processing time. It is a measure of how much work the server has to do in order to generate the response to the HTTP request for the given object. For instance, if a system requests a static file, such as a .jpg, the server merely needs to read this from disk so this will typically have a low server processing time (~5 ms). However, if a system requests something that requires server-side code to run, perhaps including issuing a request to a database or performing a CPU-intensive calculation, this can take much longer. A system can use the server processing time to make smarter decisions and to reduce the time it takes to download the files over the pool of connections. If a file has a small file size (for example, 3 KB which will fit in one round trip at start-up of a new TCP connection), and a large server processing time, then the system may efficiently go ahead and request the file on a cold (slow) connection. Even though this file takes a long time to download overall, there is no benefit to giving it a fast connection because it is not slow due to file size, but rather it is slow due to server processing time. This insight, and the server processing time value retrieved from the analysis server, allows a system to mitigate the impact of TCP slow start on the overall time required to download the objects required to render the page.

Still another component of a model may be an error rate, or a rate at which a particular server drops a communication, stalls, or otherwise fails to complete a round trip communication. This may be expressed as a frequency of restarts for a particular request, or in any value for recording errors associated with a channel, server, or other identifier associated with a particular channel.

The combination of these and any other potential elements of a model may then be used to determine appropriate channel assignments for objects to be downloaded in a particular web page transaction.

Any of the components of the model are updated dynamically. For instance, a large high priority file may be assigned to a given connection that is measured to be operating at a high speed. However, if during the monitoring of the connection, it appears that data is taking longer than expected (which according to one model is one RTT) then the overall model can be updated and a new request for this object or for the remainder of this object can be issued. The remainder of static objects can be requested via HTTP byte range requests. In general, the model is dynamically updateable in response to network events.

Figure 5:
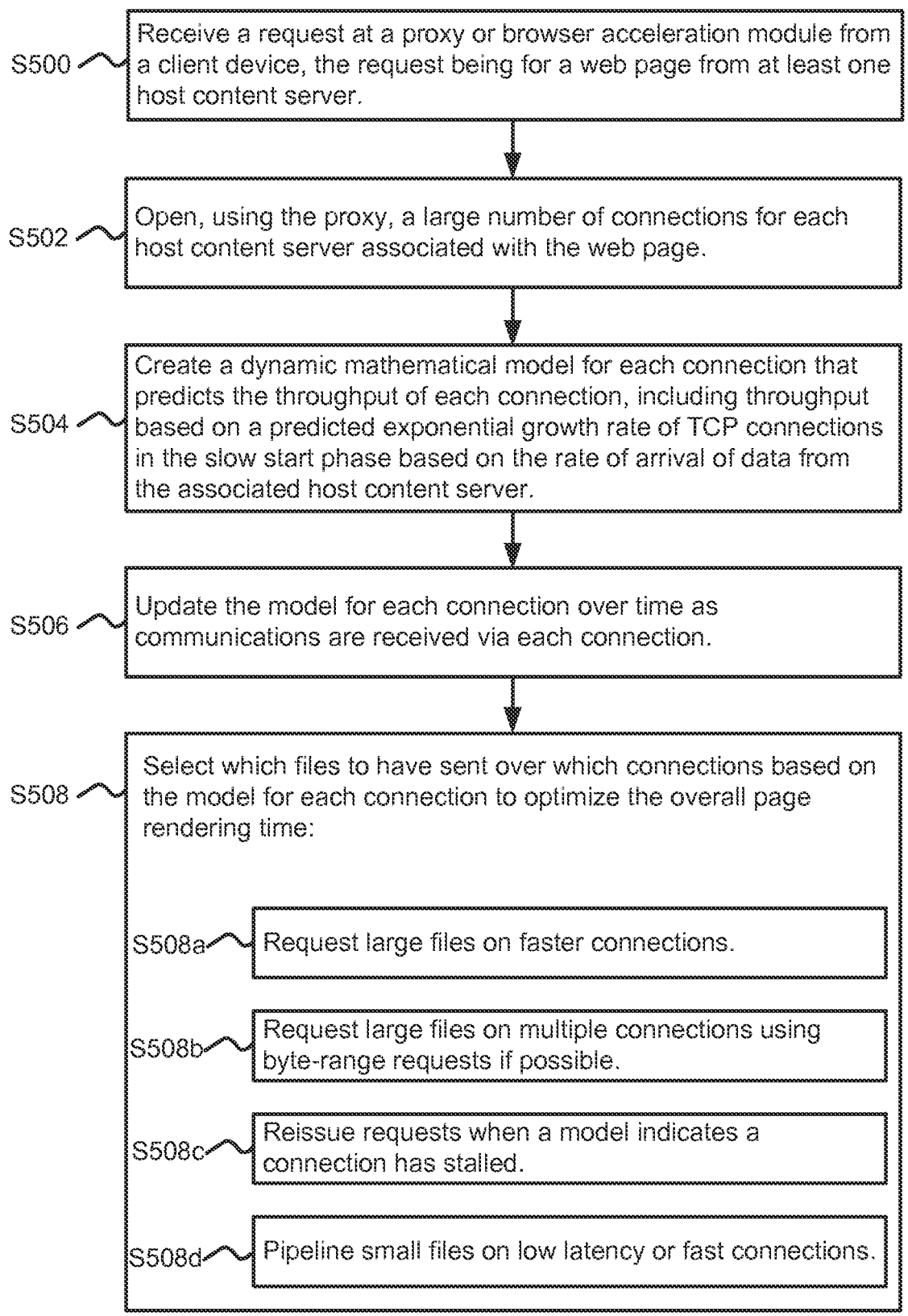
FIG. 5 illustrates one example of web page load data for use with a system in accordance with the present innovations.

FIG. 5, then, describes an additional embodiment of a method for modeling connections and optimizing web page transactions. In S500, a proxy module or browser acceleration module receives a request from a client device for a web page from a content server. In S502, the proxy opens a large number of connections for each host content server associated with the web page. The number of connections opened may be a set number, a number associated with the particular content server, or may be based on a previously created model of the web page transaction for the particular web page. The number can be based on information from the analysis server, which has looked at many transactions associated with this server and concluded that it is enforcing a limit to the number of TCP connections it will accept from a user at a given time.

In S504, the proxy creates a dynamic mathematical model for each connection that predicts the throughput of each connection, including throughput based on a predicted exponential growth rate of TCP connections in the slow start phase based on the rate of arrival of data from the associated host content server. The model may further include latency, history data associated with restarts or stalled requests, or any other similar information that may be used to predict performance of each connection.

In S506, the model for each connection is updated over time as communications are received via each connection. Thus, for example, as a particular connection transitions from the exponential growth phase associated with slow start to another phase, the model may be updated in real time or near real time to adjust allocation of objects that remain to be requested as part of the web page transaction. In various embodiments, updates may be set at particular times, or may be set in response to certain triggers. For example, the system may first identify a large object or serializer for future download, and may then trigger an update to the model based on the need for a current optimized connection selection.

In S508, the system then allocates files to particular connections. The system selects which files to have sent over which connections based on the model for each connection to optimize the overall page rendering time. This selection may be done by a specialized module of the proxy or browser acceleration module, or may be integrated with any appropriate system of a computing device which functions to request the objects over the modeled connections. In various embodiments, different algorithms and tools may be available to a system to adjust and optimize overall web page download and rendering time using the connection models. In a simple model, S508a may be used alone where large files are assigned to faster connections. In other embodiments, S508b may be used where byte range requests may be used to break a large or slow file up among multiple connections.

In S508c a model may identify when a connection has stalled. While certain protocols include mechanisms to restart stalled requests, a connection model may use historical data to identify average latencies for a particular socket, and may respond faster than a generic protocol mechanism using the model information. The response to stalled connections may be to reissue one or more requests for the same object on multiple connections, and to use the copy of the object that is received first.

In various embodiments, then, combinations of any of these optimizations may be done to minimize the overall time to receive all objects for a web page at a client. When the large numbers of connections are opened during S502, the system may immediately begin collecting data to model or update existing models for each connection. For example, in S508d, small files may be pipelined on low latency or fast connections. Thus, selection methods for assigning connections may then use the models to determine which objects to request on which connections.

Figure 6:
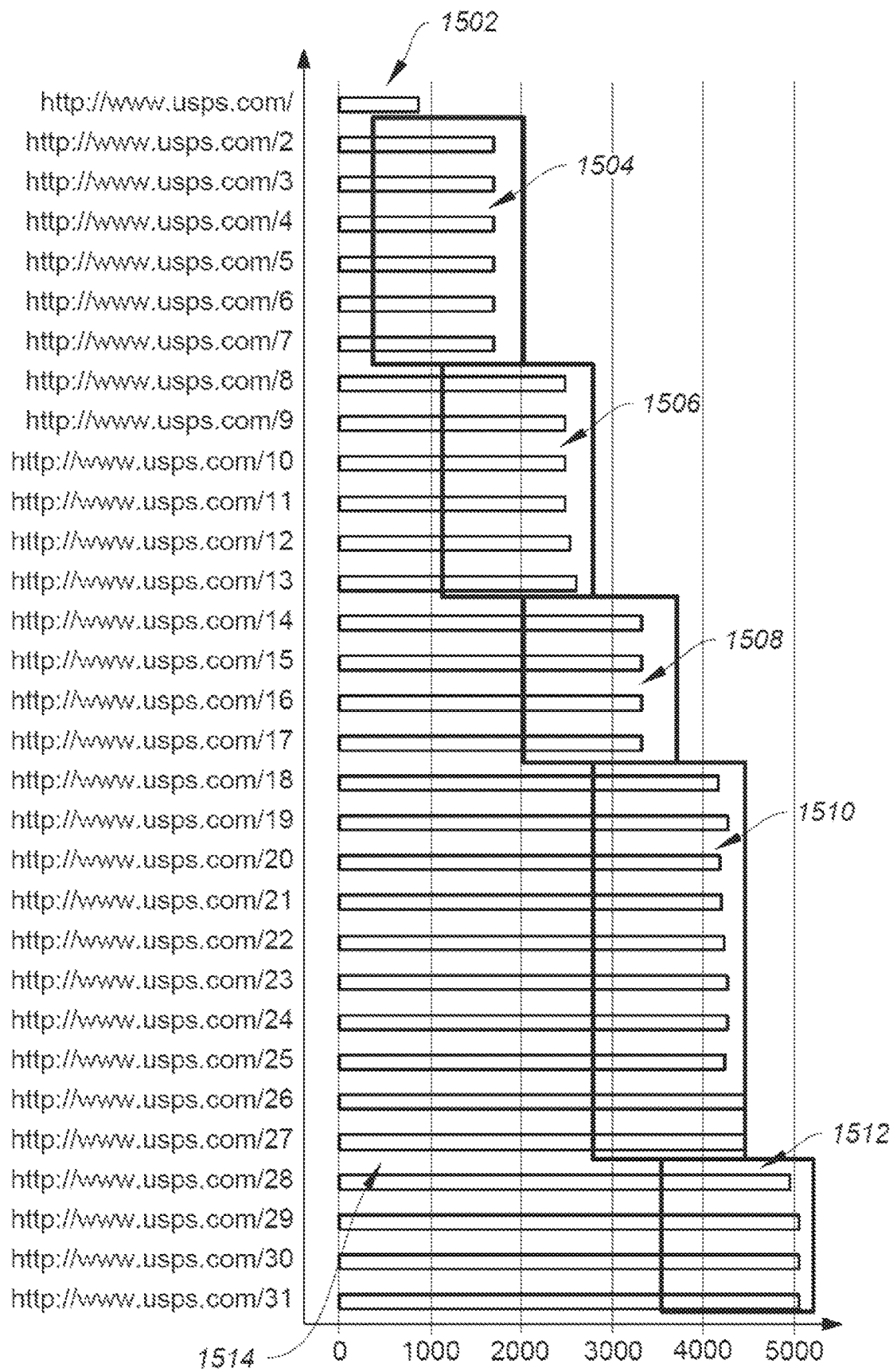
FIG. 6 is a flowchart describing one potential method of improved web page loading in accordance with the innovations presented herein.

In certain embodiments, this optimization may be further improved and the methods used to select connections altered if the system has additional information about dependencies within a particular web page transaction. FIG. 6 shows another timing chart similar to the timing chart of FIG. 4. Instead of showing both a start and stop time for each object, FIG. 6 only shows the time at which each object is finished being received at a client system and is thus available for use in rendering the completed web page. FIG. 6 shows a timing chart for a potential real world example of a second web page transaction for "http://usps.com" that may be analyzed and accelerated in accordance with embodiments of the present innovations. The chart has a list of objects along the vertical axis and a time along the horizontal axis. The root HTTP request for http://www.usps.com is timing 1502. A first set of child objects that follows from the root is indicated by a box around object timings 1504. A second set of child objects that follows after the first set of child objects is indicated by object timings 1506. Similarly, third child object timings 1508, fourth child object timings 1510, and fifth child object timings 1512 are shown, each roughly following in a progressive fashion from the previous set of requests and responses. The area to the left of the labeled timing boxes, generally indicated by timing area 1514, is the delay from the beginning of the web page transaction for each set of child objects. Because of the progressive nature of the chart with later transmitted objects being shown at the bottom, this may be considered or referred to as a waterfall chart.

Although the web page transactions illustrated in FIGS. 4 and 6 both appear to have groups of object timings that progress from one set of timings to another, there may not be an actual dependency from any later timing group on a previous group, and the design of a web page may vary in nearly any matter set by the creator of the web page. In order to determine if there is an actual timing dependency between objects, additional information or analysis is needed.

As described herein, web transaction tracking may be used to identify dependencies within a web page transaction to identify when information from a first object is actually required to request a second object, and when a second object is merely requested after a first object because it is referenced in the first object, without actually requiring information from the first object, for example, to calculate a value that impacts a selection among multiple potential second objects.

FIGS. 7A-D and 8A-D illustrate examples of how web transaction models may be used with connection models to optimize a web page transaction. While certain examples are shown in FIGS. 7A-D and 8A-D, a large number of alternative optimizations will be apparent under various circumstances in different embodiments, not all of which may be explicitly described herein. Additional embodiments are now referred to in which certain systems may identify web pages which include objects that may be required by the system to be fetched serially. Also described are methods that include multiple rounds of prefetching enabled for a single web page transaction to improve performance where these serializing objects occur. Additionally, the descriptions of identifying serializing objects and using this information to prefetch in a progressive manner may be instituted with any combination of the prefetching improvements described above. In certain embodiments, the fastest prefetch performance may be achieved if all children or as many children as possible can be requested as soon as the system sees the initial root HTTP request. In some embodiments, a portion of the system that tracks prefetching operation hits, misses, and failures to improve prefetching performance receives a copy of the root HTTP request as it is observed by the system. The tracking portion may then send back a list of child HTTP objects to prefetch. This type of system functions with a single prefetch list created upon observation of the root HTTP request. Additionally, when all child objects for a web page transaction are known at the beginning of a transaction, connection models may be used with information from a web transaction model to make optimization of the web transaction easier and better.

A first issue that can cause problems and that may prevent a prefetching system that functions at the time of the root request from working for certain objects is when information needed to synthesize requests for children may not be available, but rather requires getting responses from the web servers or even additional requests from the browser. In other words, details required to make the appropriate child request are received during the course of a chain of requests and responses, and so the object cannot be prefetched at the beginning of the chain.

A second issue that can cause problems and that may prevent this from working occurs when responses during the download set cookies that affect the content delivered in response to subsequent child requests. Similar to the issue above, this is caused by appropriate information not being available at the time of the initial root HTTP request. Instead, the information comes in the form of a cookie that is set during the chain of requests and responses. The prefetch requests should not be issued until the correct cookies are available.

For the purposes of the present application, a "serializer" is any object, request, or response in a web page transaction that includes information that is required prior to a request or response for a later object. "Progressive prefetching" is any prefetching system or method that uses information about serializers in order to prefetch objects in a web page transaction while respecting the inter-object dependencies. In certain embodiments, rather than a single prefetch list created on observation of the root HTTP request, the tracking system may provide multiple prefetch lists, or a list that includes dynamic portions that will respond to information received during the course of the web page transaction.

A tracking system may detect these issues if the objects in the web page transaction or the updates after a download include indicators or data about the order in which requests were issued. The tracking system may also interact with the cookies attached to requests and dropped in responses. The tracking system may then build a model of the sequence of events that needs to occur when this root page is downloaded. In certain embodiments, the information required as part of the dependency may be considered a state change at the prefetching system, which allows creation of the desired prefetch request. Additionally, rather than generate a simple list of URLs to be prefetched, the tracking system may supply the prefetching system with a list of instructions as to the timing of requests and how information from responses and subsequent object requests during the page download can be used to synthesize dynamic fields in the child URLs.

In one potential embodiment, a prefetching system may enforce a maximum number of concurrent prefetch connections outstanding at any one time. In such a system, prefetch objects may be queued until there is an open slot below the maximum number concurrent threshold available for an additional prefetch connection. This limit on the number of prefetch connections may operate in conjunction with the prefetch sequence seen in a prior web page transaction, such that both the timing and order of the previously seen transaction is respected as well as the limit on concurrent prefetching transactions.

FIGS. 7A-B and 8A-B show simplified web page transactions to illustrate various real dependencies and a response that may be made by a prefetching system that uses progressive prefetching.

Figure 7A:
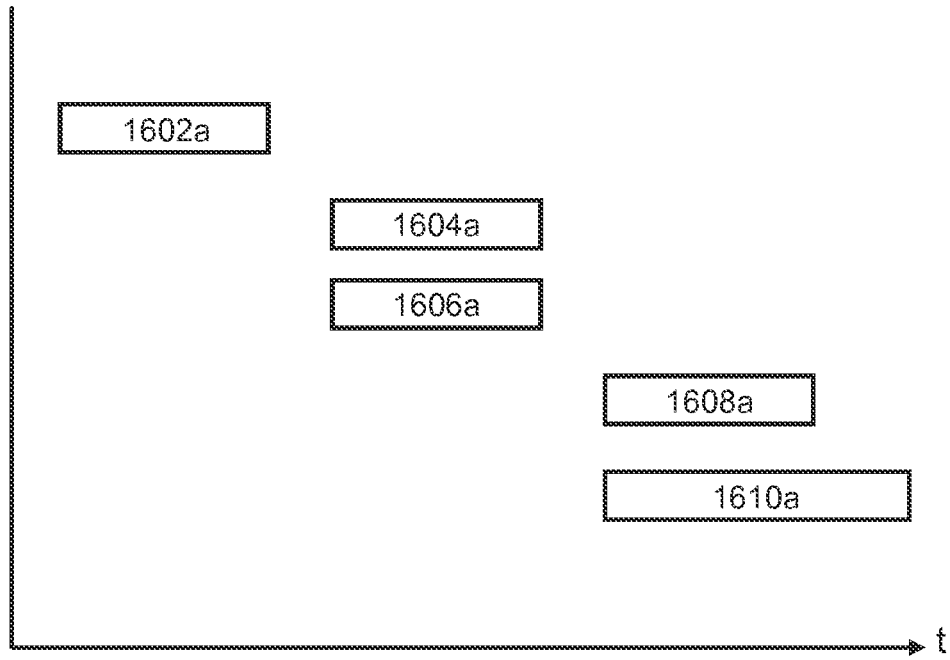
FIG. 7A illustrates one example of web page load data for use with a system in accordance with the present innovations.

FIG. 7A shows a web page transaction consisting of root object 1602a and child objects 1604a, 1606a, 1608a, and 1610a. For the purposes of all FIGS. 7 and 8, boxes associated with the objects illustrate a timing from the beginning of the object request by a user system at the left side of each box to the completion of the object response to the user at the right side of the box. Web page models are assumed to show timing with connections having equal performance, and therefore representing the relative sizes of objects. Portions of FIGS. 7 and 8 showing relative connection performance as predicted by models do not represent relative size differences between objects but instead show timings as influenced by connection performance.

In a system without prefetching, the system has no knowledge or information about actual dependencies between objects. The system may simply have timings for the response and request. Although FIG. 7A includes a pattern of progressive requests and responses, the delay may be created not by a dependency, but by a caching limit, a connection limit, or some other limitation on the communication connection between a user and a content provider.

In certain embodiments, a system with progressive prefetching may implement methods to identify the actual dependencies between objects and to distinguish these from limitations that are caused by some other means. Such a system may identify the serializers by scanning requests and responses for indicators that there is an interdependency. Such a system may also simply analyze timings after completion of a web transaction to identify serializers for use in a later transaction of the same web page. Additional details relating to the determination of the interdependencies is described below.

Figure 7B:
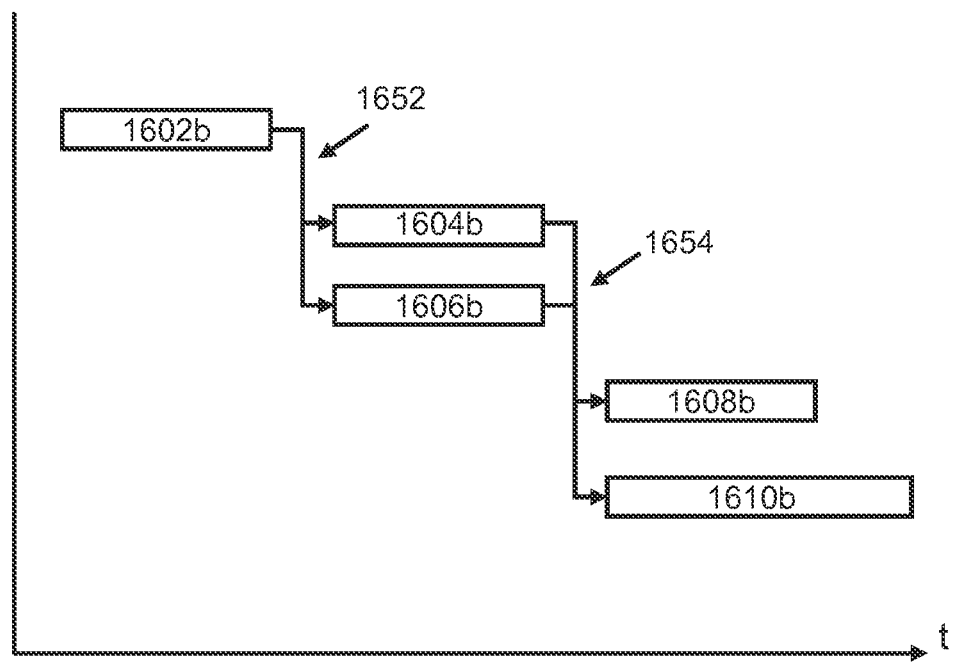
FIG. 7B illustrates one example of web page load data for use with a system in accordance with the present innovations.

In FIG. 7B, an embodiment of the system has analyzed the objects and identified interdependencies 1652 and 1654. As illustrated, since both 1604*b* and 1606*b* depend on 1602*b*, they may not be prefetched until after the request and response for object 1602*b* is completed. Similarly, both 1608*b* and 1610*b* depend on both 1604*b* and 1606*b*, so neither 1608*b* nor 1610*b* may be prefetched until the response for both 1604*b* and 1606*b* is complete. Given these dependencies, the relative order from the transaction shown in FIG. 7A may be maintained to respect the interdependencies during any progressive prefetching. Any later request for the same web page that uses prefetching will have a similar order of object retrieval due to the interdependencies between the objects.

Figure 7C:
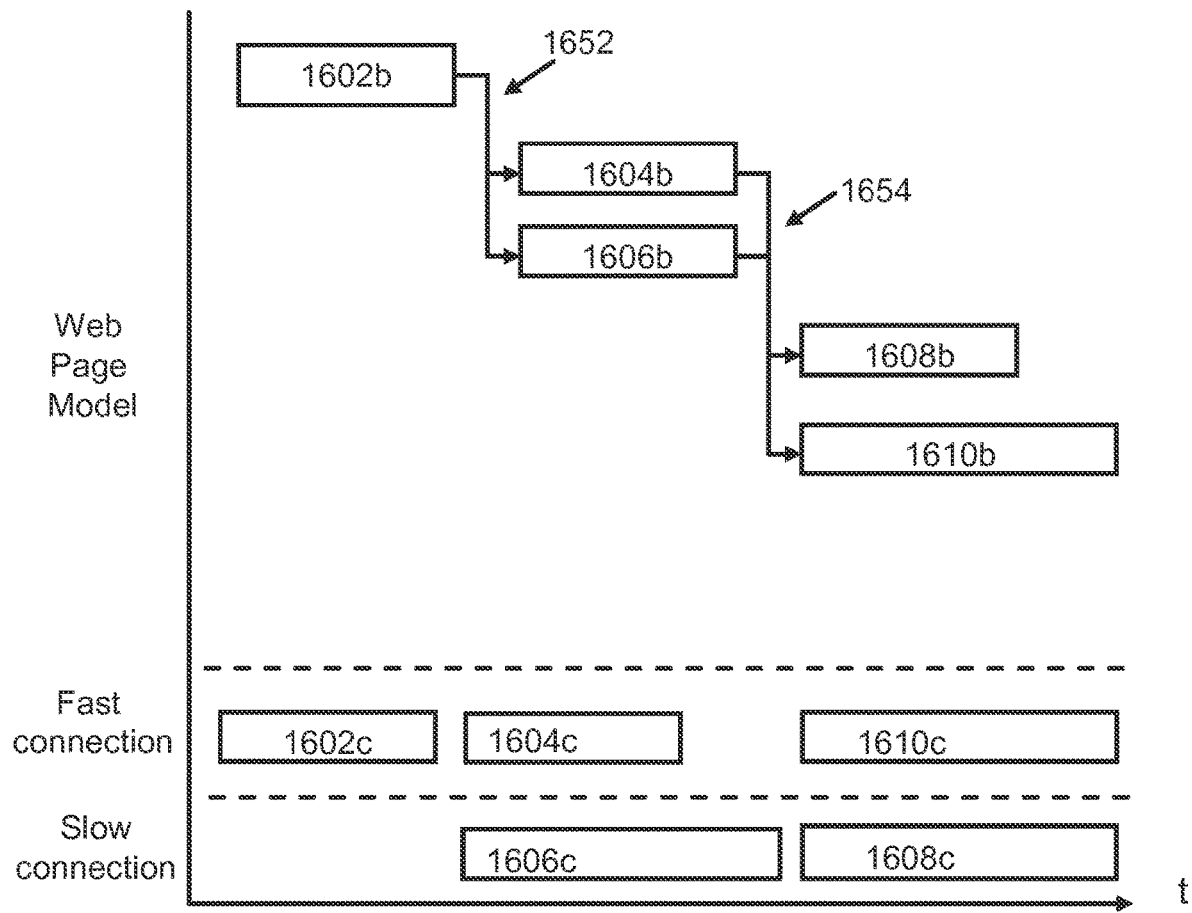
FIG. 7C illustrates one example of web page load data for use with a system in accordance with the present innovations.

FIG. 7C shows both the web transaction model of FIG. 7B along with connection selections on timings for a system in which two connections are available for the objects. As shown by FIG. 7C, the system may identify characteristics of the connections to identify a fast connection and a slow connection. In alternative embodiments, other characteristics such as latency, delay, and reliability may be considered. In the simple example of FIG. 7C, the decision process may be automated simply because the interdependencies are simple and the decision of which connection to select for each object is simple. For object 1602*c*, the object is requested on the fast connection, and the slow connection is left open. For the next set of child objects, either connection may be used, since the objects are similar as shown. For the grandchild objects 1608*c* and 1610*c*, the larger object 1610*c* is requested over the fast connection, and the smaller object 1608*c* is requested over the slow connection since this is the result that produces the fastest response time. A decision-making process for which objects to request on which connections may be performed in multiple ways. In certain embodiments, a set of rules may be kept for each potential optimization, such as matching large files with fast connections, or splitting object requests where possible to minimize download time. Some of such embodiments may analyze all objects to optimize the overall web page transaction.

In another embodiment, analysis of critical paths or the slowest serializers in a web page transaction may be done to identify only the serializers. In the web page model of FIG. 7C, 1602*b* is a serializer since any optimization of 1602*b* improves the overall timing. 1604*b* and 1606*b* are joint serializers since any improvement to one has no impact on the system unless a similar improvements made to the other. Finally, 1610*b* is a serializer since it is larger than 1608*b* until its transfer time is equal to that of 1608*b*. As various optimizations are used to lower the transfer time of 1610*b*, 1608*b* may become the serializer for the set of grandchild objects shown in FIG. 7C.

Figure 7D:
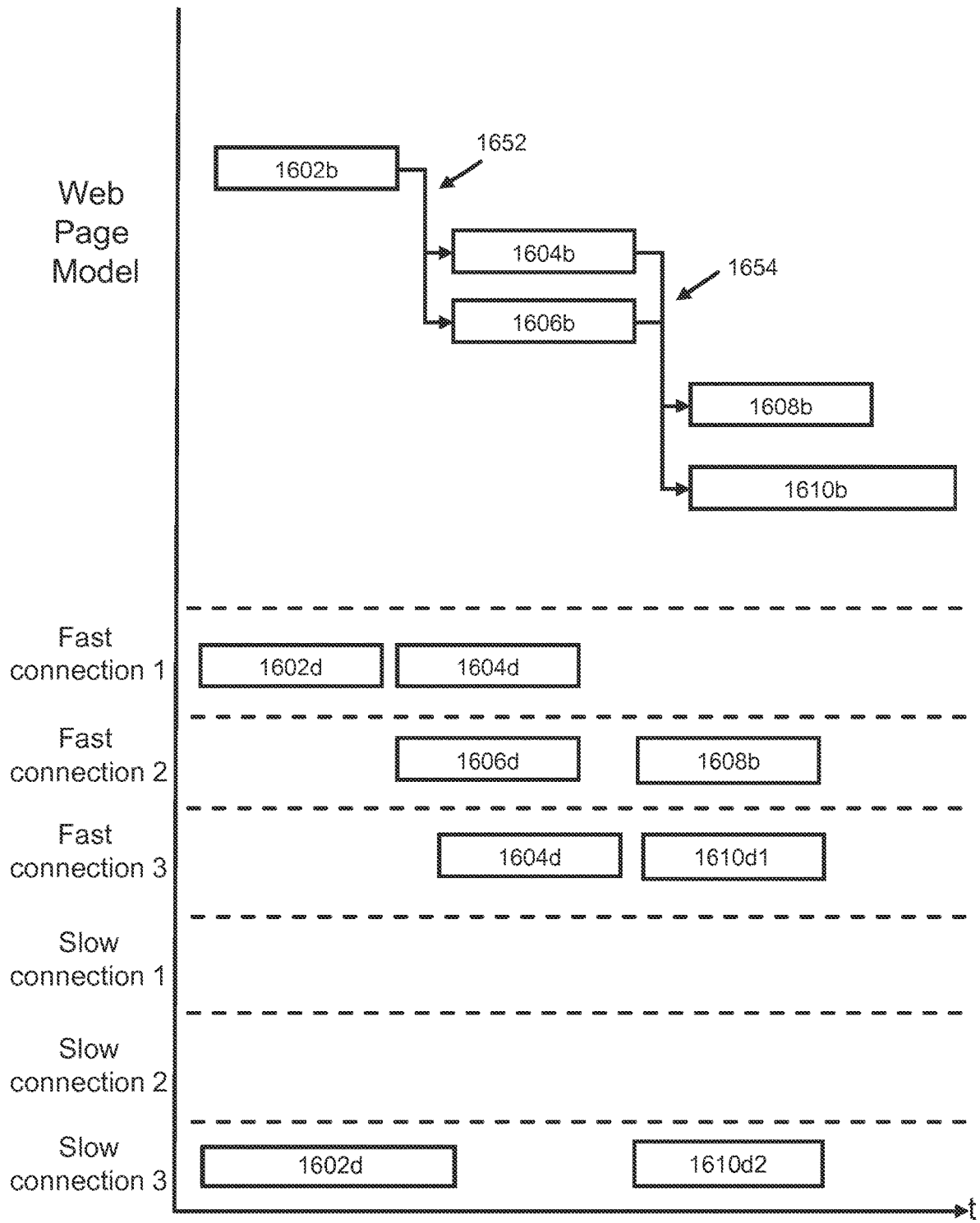
FIG. 7D illustrates one example of web page load data for use with a system in accordance with the present innovations.

FIG. 7D shows another embodiment in which the number of available connections is greater than the number of objects to download at any given time. During the download of root object 1602*b*, the system may decide to request multiple copies of object 1602. As shown in FIG. 7D, object 1602*d* is requested twice, once on fast connection 1, and once on slow connection 3. This lowers the chances of the entire transaction being delayed due to a stall, and also provides additional connection model information. Such extra information may be especially helpful at the beginning of a transaction when the connection models have limited information. As one connection is obviously slower than another, the request for the object on that connection may be terminated, or the entire connection may be terminated.

As soon as the first copy of object 1602*d* is received, the child objects that require 1602*d* to finish before the child objects are requested may be requested. As shown in FIG. 7D, objects 1604*d* and 1606*d* are requested after object 1602*d* is received. Shortly thereafter, the system may determine that fast connection 1 has stalled, and may re-request object 1604*d* on fast connection 3. Fast connection 1 may then be blacklisted for the remainder of the session, or fast connection 1 may be identified as only for use if an object may be concurrently requested on another connection.

As shown by the web page model, objects 1608*b* and 1610*b* require both objects 1604*b* and 1606*b* to complete before objects 1608*b* and 1610*b* are requested. Because object 1610*b* is larger than object 1608*b*, the system may focus on optimization steps to reduce the download time of object 1610*b*. For example, object 1610 may be split into two parts using byte range requests. As shown in FIG. 7D, object 1610 is requested in two parts as object 1610*d*1 and object 1610*d*2. Such partial requests may simply split an object into two equal pieces using commands that are part of HTTP to request the first half and the second half of object 1610 as equal pieces. In alternative embodiments, connection models may be used to optimize the byte range requests, such that a smaller byte range is requested on a slower connection and a larger byte range is requested on a faster connection. As shown in FIG. 7D, object 1608*b* is requested on a fast connection, a large byte range is requested on fast connection 3, and a smaller byte range is requested on slow connection 3 in a way that minimizes the overall download time for the two objects. If, for example, object 1608*b* was requested on a slow connection and multiple parts of object 1610 were requested of fast connections, then most likely object 1608*b* would be completed significantly after object 1610, causing additional delay.

In certain embodiments, limits may be placed on the use of byte range requests to avoid additional system loads caused by the need to integrate split objects received by byte requests. In other embodiments, byte range requests may always be used to fill the available connections in order to minimize the total object transfer time for all objects in a system. In still other embodiments, a set of rules and projection models that include extra rendering time for split objects may determine when object splitting using byte range requests is valuable in real time, including any effects of latency and other system parameters.

Figure 8A:
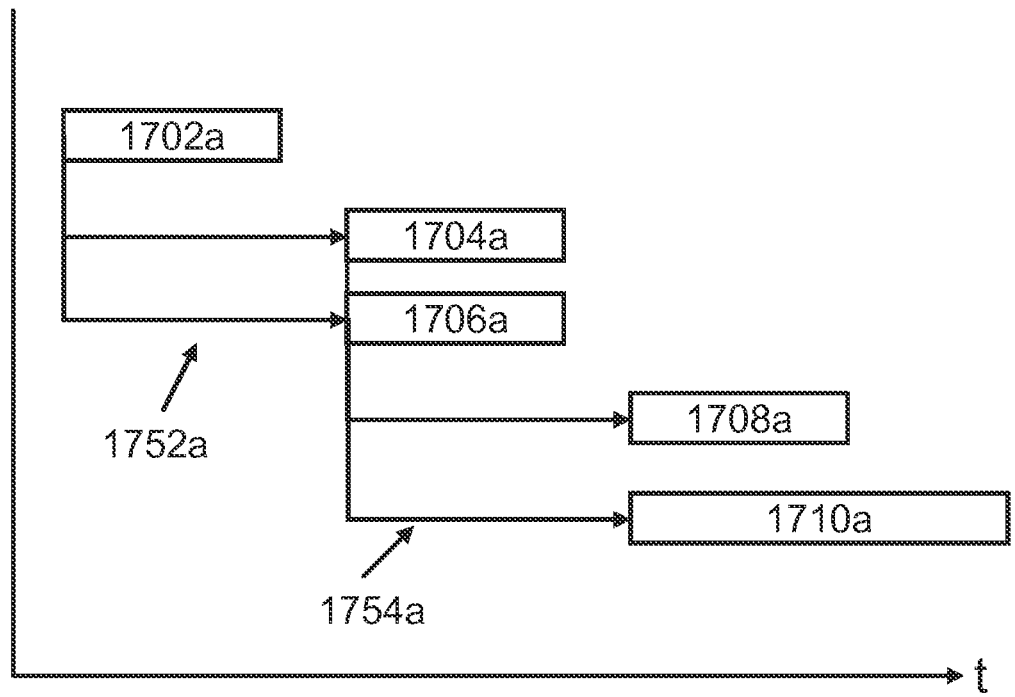
FIG. 8A illustrates one example of web page load data for use with a system in accordance with the present innovations.

FIG. 8A shows a similar web page transaction with objects 1702, 1704, 1706, 1708, and 1710. In FIG. 8A, however, the system has identified a different set of dependencies. Objects 1704 and 1706 depend only on the root HTTP request for object 1702 via dependency 1752. In other words, objects 1704 and 1706 do not require information from the root response that would be completed to the user at the time associated with the right hand side of the box for object 1702. The same is true for objects 1708 and 1710, which have dependency 1754 which means the objects are requested based only on the request for objects 1704 and 1706, and there is no reliance on information from the previous objects.

Figure 8B:
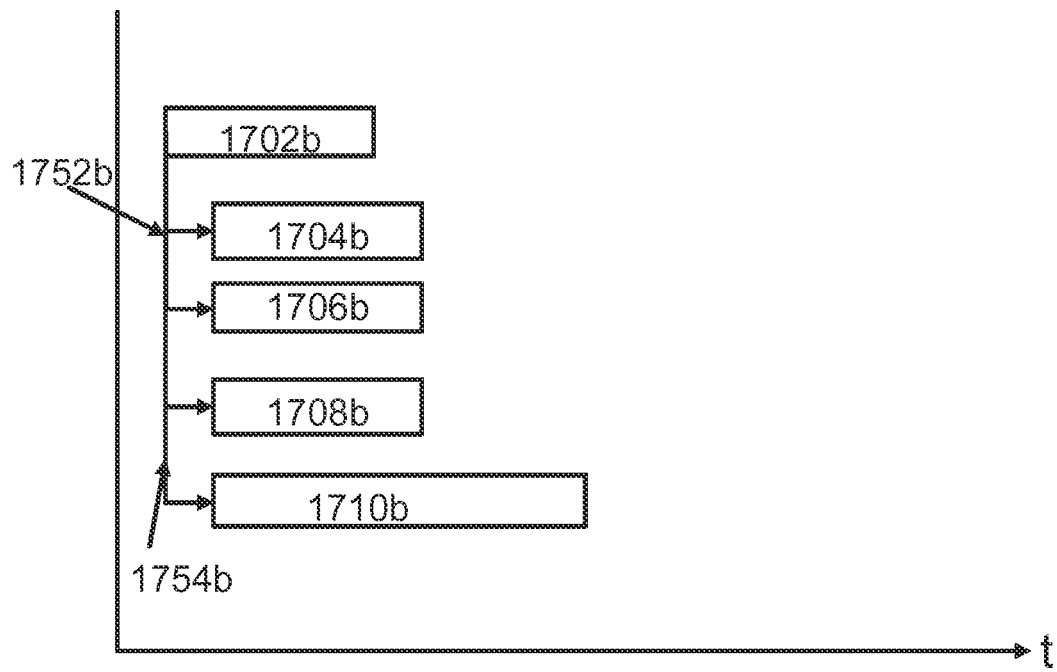
FIG. 8B illustrates one example of web page load data for use with a system in accordance with the present innovations.

FIG. 8B then shows a later request for the same web page as the web page of FIG. 8A. Because none of the child objects rely on information from any response, all of the objects may be prefetched as soon as the system sees the request for root object 1702. Because of the total lack of interdependencies, the example of FIG. 8B essentially shows an embodiment of a progressive prefetching system functioning as a prefetching system without utilizing any functionality for dealing with serializers.

Figure 8C:
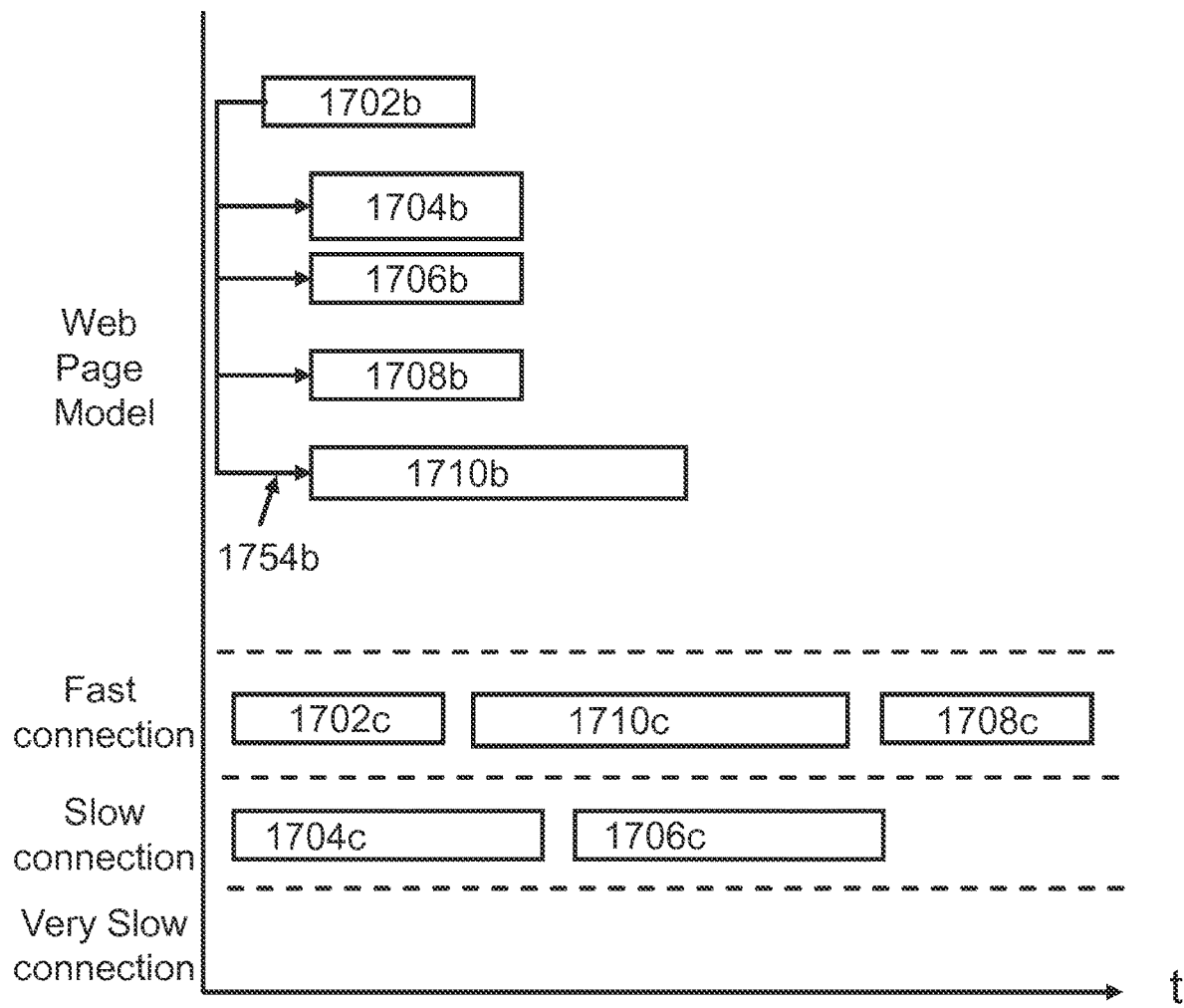
FIG. 8C illustrates one example of web page load data for use with a system in accordance with the present innovations.

FIG. 8C shows a first example of a system selecting connections for objects when the number of objects available for current transfer is greater than the number of available connections. In FIG. 8C, the web page model is used to identify that all of objects 1702c-1710c are available to be requested, but three connections are available. The connection model may identify that using the very slow connection for even the smallest object would be slower than pipelining objects on the other two connections. Thus, the system may analyze the available connections and determine that the overall fastest request structure is to request objects 1702c, 1710c, and 1708c on the fast connection, and objects 1704c and 1706c on the slow connection, with no objects requested on the very slow connection. Such embodiments may further determine that using byte range requests and/or duplicate requests is either not preferable or not enabled for this web page transaction.

Figure 8D:
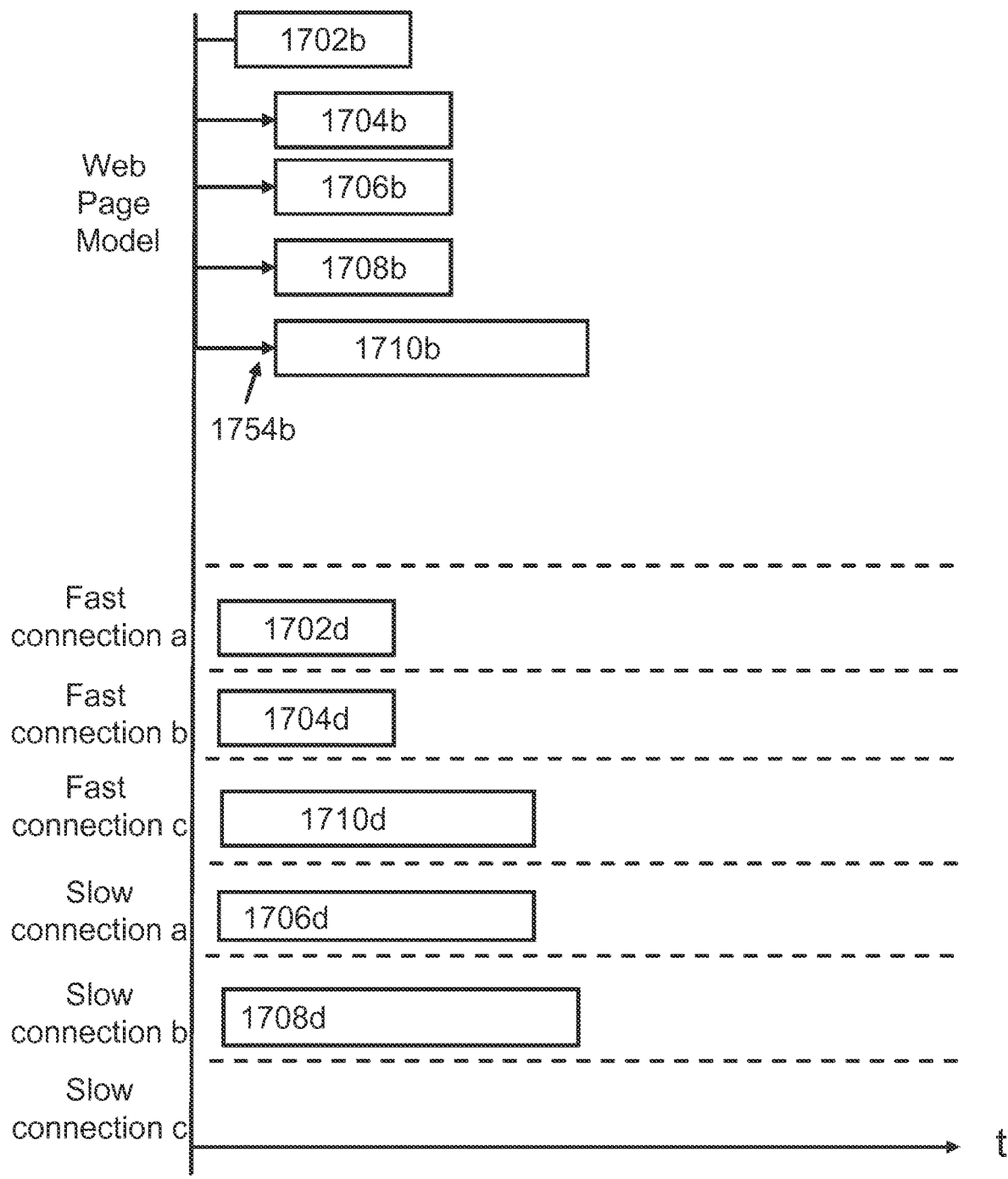
FIG. 8D illustrates one example of web page load data for use with a system in accordance with the present innovations.

FIG. 8D shows a second example of a system selecting connections for the web transaction model of FIG. 8C but in an embodiment where the number of available connections is greater than the number of objects to be downloaded at any given time. This is essentially the simplest use of connection models, where larger files can be assigned to faster connections. If similar sizes of smaller files exist, they may be assigned randomly to fast or slow connections if the amount of processing time required to identify benefits of faster download time is deemed to be on par with the amount of time that would be saved, especially in circumstances where allocation is likely to simply change objects of similar size between connections with little or no final impact on overall download time for the web page transaction. Additionally, if there are remaining connections still unused after issuing requests for all of the objects to download, requests for high priority small objects can be issued again on the extra, unused connections. This makes the system robust to packet loss at little expense in terms of extra bytes downloaded.

While the above examples show embodiments of web page transactions with a smaller number of objects, it is to be understood that any combination or all of the above allocation techniques may be used in a single web page transaction, and certain web page transactions may involve hundreds of objects and similar numbers of connections to one or more host content servers. Additionally, a single web page transaction may involve multiple host content servers, with the above methods applied to each connection and each content server.

Figure 9:
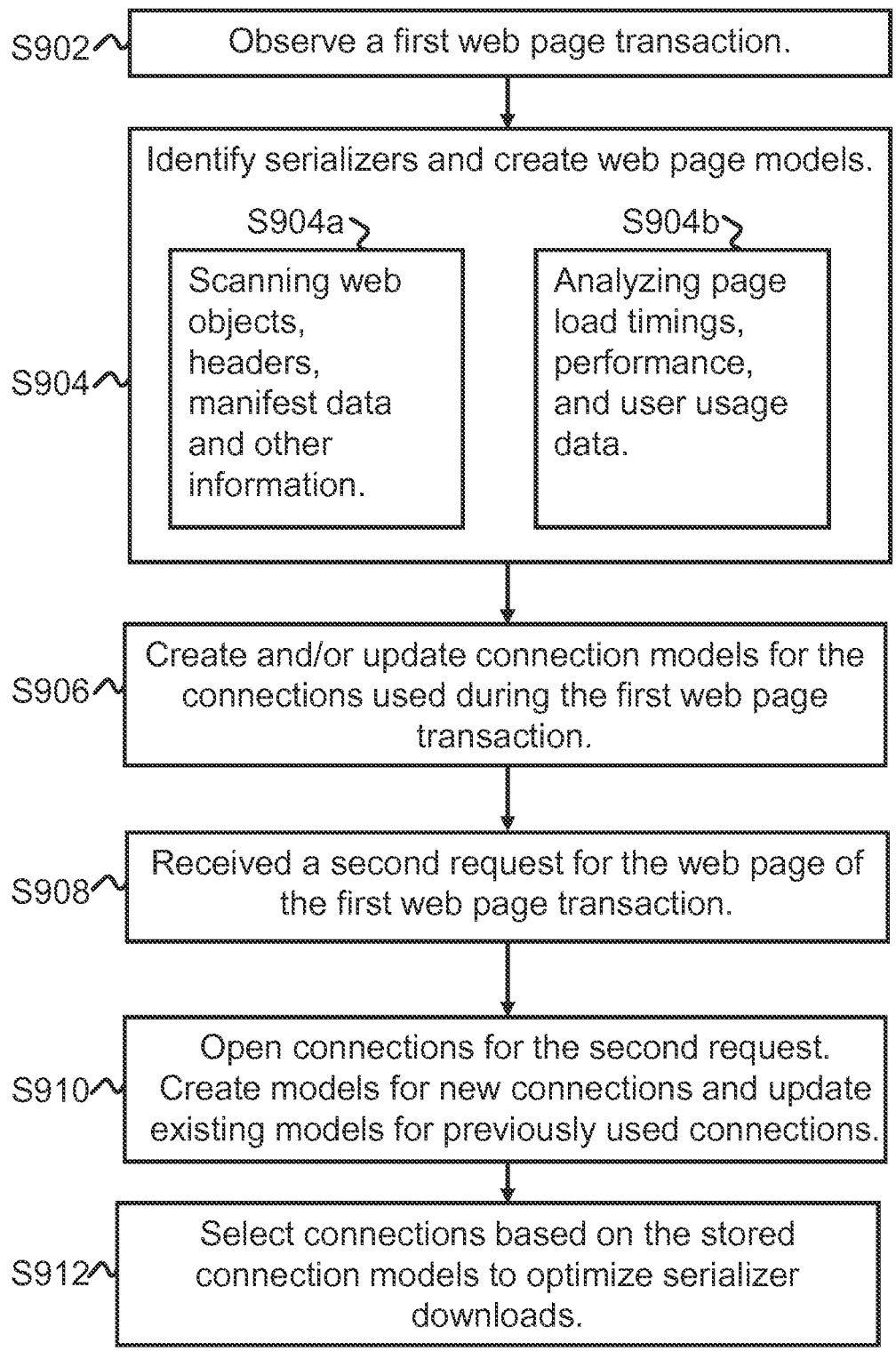
FIG. 9 is a flowchart describing one potential method of improved web page loading in accordance with the innovations presented herein.

FIG. 9, then, describes a basic method for progressive prefetching in conjunction with progressively updated connection models that may be incorporated into various embodiments. In S902, a prefetching module or serializer identification module observes a web page transaction. S902 may be performed in a proxy server such as proxy server 120 of FIG. 1A. Alternatively, S902 may be performed in client such as client 105 of FIG. 1A, by a proxy client 110 or by any other module within client 105 such as a web browser 206 of FIG. 3. S902 may also be performed by a prefetch analysis server such as prefetch analysis server 121 of FIG. 1C.

In S904, the system identifies serialization relationships between objects. These are serialization relationships such as dependencies 1652 and 1654 of FIGS. 7B-D and, dependencies 1752 and 1754 of FIGS. 8A-D. Various different methods may be used to identify these dependencies.

In S904a, objects are scanned to identify dependencies directly from the contents of the object. The system may include rules for contents of an object, such that when a parser scans through an object and identifies content with an associated rule related to progressive prefetching, the system creates a dependency for the identified objects. For example, a first object that contains a particular type of call to a child object with a dynamic URL, where the dynamic URL requires an object response, may be identified by scanning an object. The scan may also identify these relationships not just from the direct object, but from headers, manifold data associated with the web page, information provided with the web page by the content provider, web page creator, or a third party. Any information available for scanning may be parsed for information related to object dependencies.

In certain embodiments, the scanning and prefetch decision making may occur in real time as the web page transaction is occurring, such that progressive prefetching decisions are made for a web page transaction that has never been seen before. In alternative embodiments, the scanning system may simply log the identified dependency for future use in later requests for the web page. As described above with similar prefetching decision making where usage data is recorded to improve future prefetching, the system may use this information on a universal basis for all users of the system, or in alternative embodiments, the system may use the information on a user, or group basis, or any combination of the above.

In S904b, the system analyzes page load timings, such as the timings illustrated in FIGS. 6-8, in order to identify potential dependencies. Although individual web page transactions will not provide definitive proof of dependencies, a system may infer a dependency based off of a single observation. For example, a system observing the web page transaction of FIG. 7A may infer the dependencies shown in FIG. 7B without risk of creating errors. If a second observation of the web page shows the same timings, the likelihood that the dependencies inferred as dependencies 1652 and 1654 are more likely to be correct. This is additionally true with many repeat observations. However, if the timing order changes, the expected rules may be altered. For example, if over many observations object 1608a is sometimes requested before a response is received for object 1604a and object 1606a, the system may assume that there is no dependency for object 1608a, and alter the rule identified by the system. If the lack of dependency is later associated with page load errors, the dependency may be reinstated in a prefetching model.

In alternative embodiments, S904 may receive dependency information from a trusted outside source without first identifying or confirming the dependency. In such an embodiment, the system may simply incorporate the identified dependency into a prefetching model and prefetch based on the received information. Again, if the information received is later analyzed to be associated with misses, fails, or serialization-based errors, the system may reject the information and adjust the model accordingly. The system may then automatically share information related to the errors with the original provider of the information.

In S904, any combination of the above methods, along with any other acceptable method that identifies serializing objects, may be combined. Just as with S902, S904 may be performed on a client, a proxy server, a prefetch analysis server, or any other computing device. In certain embodiments, the observation and/or identification may be done on a stand-alone basis without any directly associated prefetching system that alters future web page transactions. In the embodiment described in FIG. 9, however, information from S904 is provided to a improve page load performance.

Further, as part of S904, web page models are created to improve page load performance in future transactions for the web page. The information may be used in a variety of ways to improve page load performance. For example, the system may identify serializers that impact overall page load performance and use connection models to prioritize serializers on the fastest connections. Further, a system may adjust prefetching decisions or system resource allocation to improve performance based on the identification of the serializers and the associated information. Such a system may further include a progressive prefetching system that uses the information from S904 to alter caching decisions. In a system that is cache limited, objects that do not typically impact page load performance over a large number of observations may be given a low caching priority, and serializers along with other objects that do impact page load performance may be given priority in cache memory where possible.

In S906, connection models used during the first web page transaction are created or updated and are stored in the system. While in certain embodiments, such models may only be used during a single web page transaction and then deleted, in other embodiments, models may be kept and updated over time, such that connection models from a first user may be leveraged by connection models for a second user, and connection performance history may be used to impact a connection model for a current web page transaction.

In S908, a second request for the same web page is then identified by the system. This enables the system to use both the previously created web transaction model and the previous connection models to optimize the current web page transaction that follows the second request for the web page.

In S910, connections are opened with the content server in preparation for the web page transaction that follows in response to the second request. Any existing connection models may be updated using information received as part of the opening of the connections. Finally, in S912, connections are selected using both the web transaction model and the connection models to minimize the overall time from the second request being initiated by a user to rendering of the web page, as described throughout.

Figure 10A:
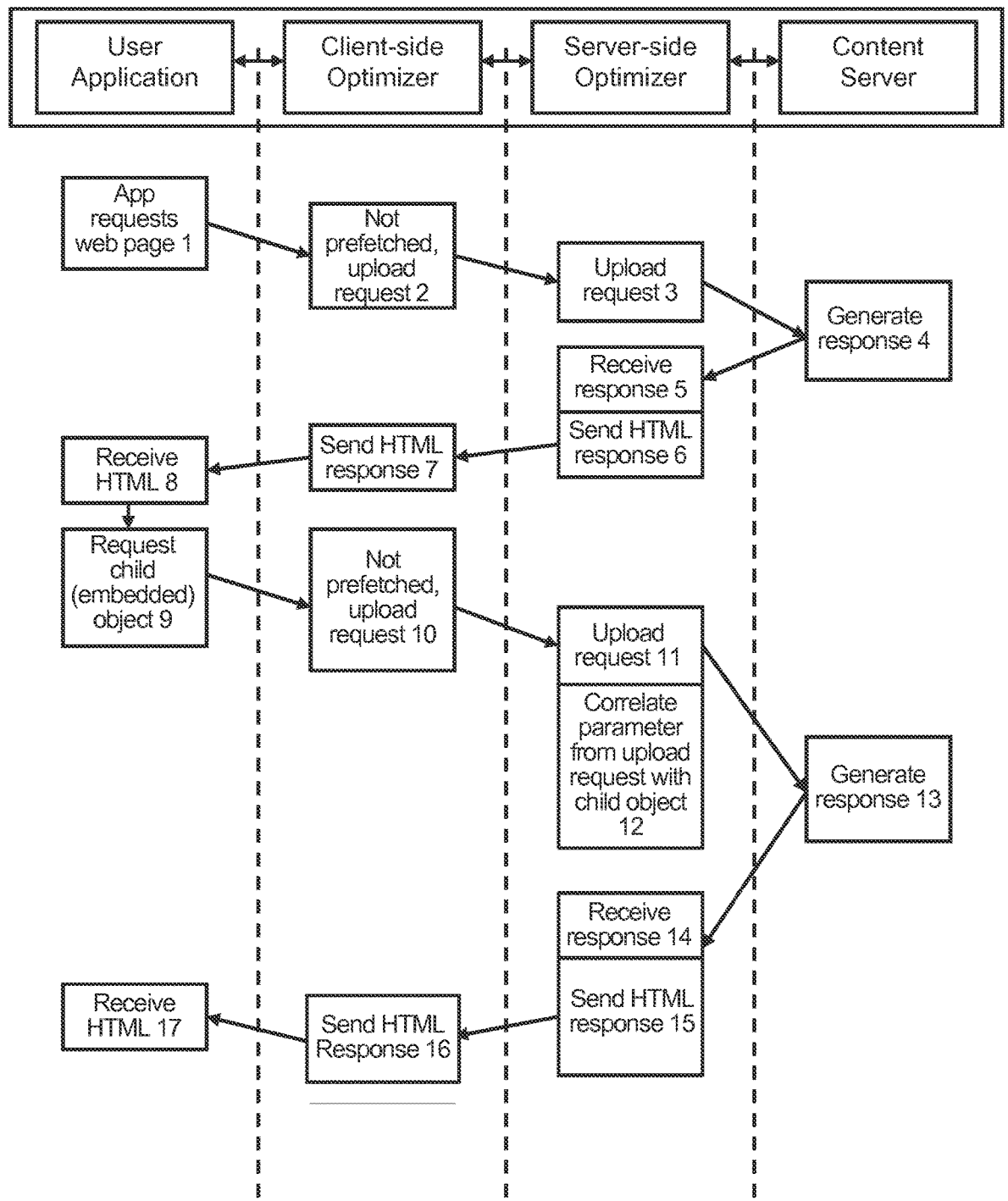
FIG. 10A illustrates a portion of a web page transaction in accordance with one potential embodiment of the innovations presented herein.
Figure 10B:
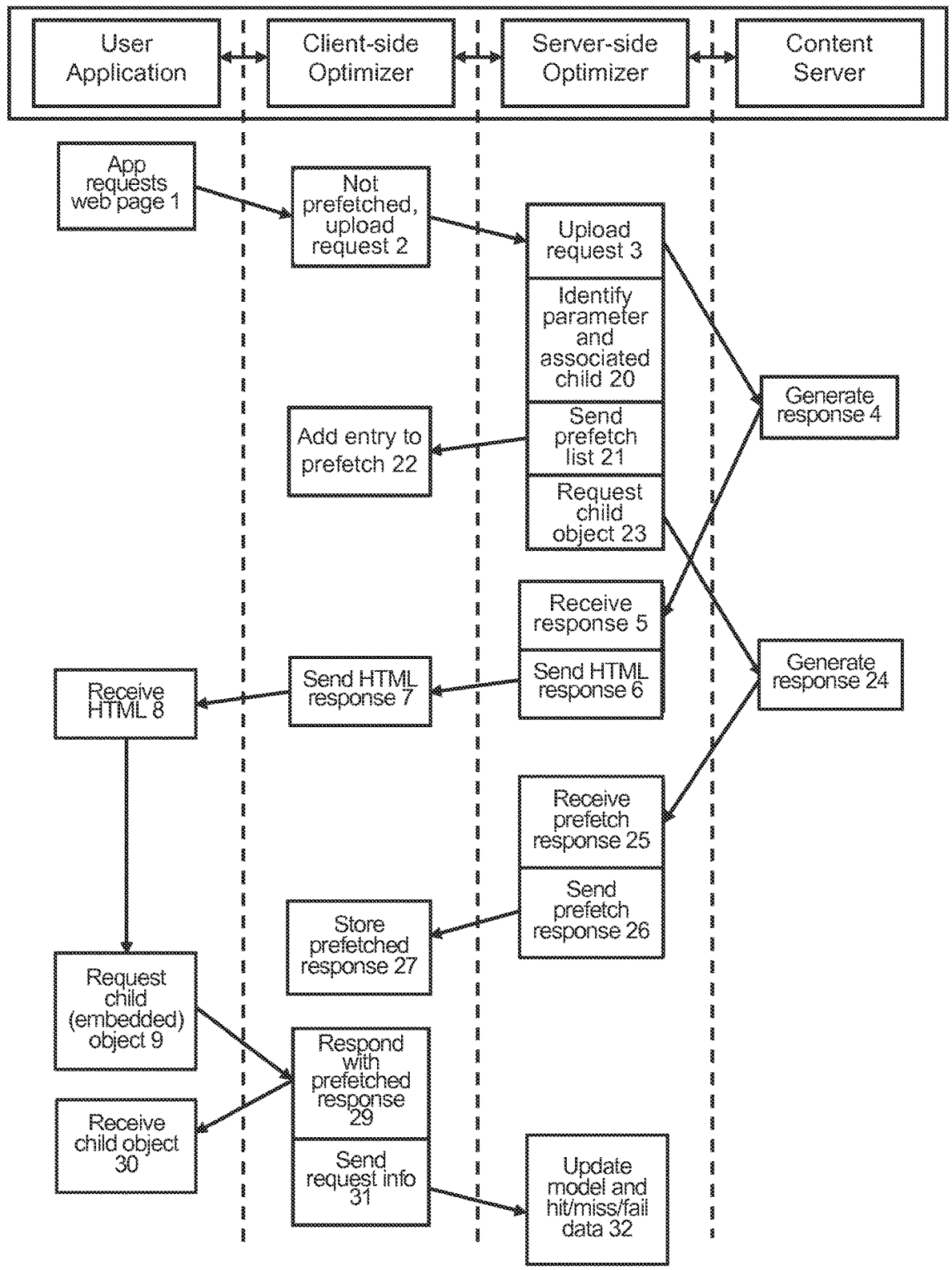
FIG. 10B illustrates a portion of a web page transaction in accordance with one potential embodiment of the innovations presented herein.

The concept of a prefetching system is described in FIGS. 10A and 10B. FIGS. 10A and 10B show hybrid flow diagrams for web page transactions according to certain embodiment. While FIG. 3 shows the use of an analysis server 211, and thus is described below with connection modeling performed at the server-side optimizer, any such connection modeling may be performed by a proxy client in a client-side optimizer. In FIGS. 10A and 10B, the system includes a user application that may be operating on a client such as client 105 of FIG. 1A, a client-side optimizer such as proxy client 110 of FIG. 1A, a server-side optimizer that may run on proxy server such as proxy server 120 of FIG. 1B, and a content server such as content server 130 of FIG. 1B.

FIG. 10A shows a process flow for a web page transaction where the system has limited or no prior information for the web page request, and where the system uses real user data from a first web page transaction to create a correlation for use in future requests for the web page. In step 1, the user application requests a web page. Such a web page is typically requested in direct response to a user input or selection, such as a mouse click or key entry, but may also, in certain embodiments, be responsive to a macro- or time-based selection operated by the application. The request is sent via the client-side optimizer, and in step 2, the system confirms that the requested web page has not been prefetched, and an upload request is then sent to the server-side optimizer.

In step 3, the upload request is received at the server-side optimizer, and is further reconveyed to the content server. Additionally, in step 3, the request for a web page as reconveyed to the content server is preceded by a first connection that is opened from the proxy server to the content server. The request for the web page may then be communicated to the content server over this first connection. The first connection may also be accompanied by requests to open additional connections with the content server. For systems which use connection modeling, a plurality of connections may be opened and initial models created for each connection. If models already exist for connections with the content server, these models may be updated using the data gathered during the process of opening the connections.

In step 4, the content server responds to the web page request by communicating the response back to the server-side optimizer. In step 5, the server-side optimizer receives the response, and in step 6, the response is conveyed to the client. In step 7, the response is received at the client-side optimizer, and communicated to the user application. The response to the application request is received by the application in step 8.

In step 9, any child requests that are embedded in the initial response are identified by the user application, and the user application requests the child objects. Step 9 may include significant numbers of child requests. Just as with the initial request, in step 10 the objects are verified not to be prefetched, and the request is sent to the server-side optimizer. In step 11, the request is communicated from the server-side optimizer to the content server. In step 11, the connections for requesting child objects may already be open, having been previously opened either as the root object was requested or in response to an identification that child objects would be requested later. In step 11, the open connections will also have connection models based at least on the connection data identified during the process of opening the connection. The system may then assign objects to certain connections based on the details of the connection model. Additionally, unlike the previous request described in steps 1 through 8, in step 12, the system has prior information about the objects and the web page transaction. In step 12, then, the system may analyze the web page transaction for web page model information that may be used in future web page transactions for the first web page. Additionally, step 12 may be performed at any point in time relative to the subsequent steps. Step 12 may analyze and create a correlation immediately upon receipt of the child request, or at any later time when additionally processing resources are available or system use of the server-side optimizer is lower. Further, in various alternative embodiments, this analysis may be performed at a different server from the server-side optimizer, at the client, or at any other acceptable computing device. Finally, in steps 13 through 17, the child response is generated and communicated from the content server through the system to the user application.

Continuing with a description of the same embodiment described in FIG. 10A, FIG. 10B describes this non-limiting embodiment when a later request for the same web page is made. The request may be made by a different user, after a prefetched copy has been removed from a prefetch system for storage limitations, or when the system has not prefetched a copy for any reason and needs a new copy from the content server. In steps 1-3, the initial request is made just as in FIG. 10A. However, when the request is received by the server-side optimizer, the web page model from step 12 of FIG. 10A is identified, along with associated child objects. The initial application request then continues in steps 4 through 8 in the same manner as in FIG. 10A. However, due to the identification of the child objects in step 20, the system may then prefetch an anticipated child of the initial application request.

As previously described, this may significantly increase the number of objects that may be simultaneously requested from a single content server. The web page transaction model may feed information about object sizes and further child or "grandchild" objects to the systems which allocate object requests to particular connections. This information from the web page transaction model may be used with information from connection models to allocate large files or serializers to faster connections. In general, information from web page transaction model and connection models will be used to schedule the file objects to be downloaded over the pool of connections in a way that minimizes page load time. This may not be the minimum time in which the objects can be downloaded because the object priority in the page will be respected. For instance, an object that is not prefetched but is instead generated by and actively requested by the browser while the page is being rendered is higher priority than a prefetched object. In addition, file size of this "actively requested" object will be unknown, so one approach would be to send that request on the fastest open connection. This might force a system to request a larger file on a slower connection, which would in turn increase the overall time required to download all the files. In this case, a system may prioritize minimum page load time over minimum time to download all of the objects.

Additionally, in scheduling a high priority file, a system may decide to schedule it as the next object on the fastest connection, even if that connection is still in the process of downloading a file, instead of scheduling it on a slower connection that is not in use. Again, this is the benefit of modeling the speeds of all of the connections and optimizing for overall minimum time while respecting object priorities.

Object priorities are set based on both information from the analysis server based on past instances of users browsing to the page or related pages with the same objects and also on information provided by the browser as the page is being downloaded. The browser knows when it is requesting a blocking serializer so this information can go into the assignment of the object priority. Objects can also be prioritized based on the order they are needed to render the page: for example, an object that is not needed until the footer of the page is rendered might initially have a low priority, but by the end of the page load it can become a blocking object that is needed to complete the rendering of the page, whereby its priority could be increased. Note that an object that is not prefetched, but is actually requested by the browser, will generally have a high priority.

The section below again describes one embodiment within the context of the mathematical statement made above in equations 1-4 in a context including priority, inter-object dependency, and server processing time.

Again, a system may assume that B is size of the file, u is starting state of the connection (expressed either in terms of current throughput of the connection or in terms of time), and T is transfer time of the file. Because T is a monotonic increasing function of B given any u, then a definition may be set that:

$$T = F(B; u). \quad (1)$$

For M files with sizes B_m where m={1 . . . M} and N connections with starting states: u_n where n={1 . . . N}, a scheduling plan may consist of N key-value pairs S_n where n={1 . . . N}. The key part holds the connection, and the value part holds an ordered list of files. Overall transfer time of all files via all connections is again, as stated above, $$\max\_over\_n(T\_n(S\_n)) \quad (2)$$

And an optimization problem is to find scheduling S's the above is minimized or:

$$\min\_over\_S(\max\_over\_n(T\_n(S\_n))). \quad (3)$$

The solution to equation (3) provides the minimum time to download the M files over the N connections. However, it does not necessarily minimize the time required to load and render the web page consisting of those files. The solution to the above equation 3 may be considered T_download and the time to download the objects in an order dictated by an optimal page load T_page. When a system determines the scheduling S_n that minimizes T_page, it will not necessarily the minimal value for T_download. Again, this is due to inter-object dependencies and the prioritization of files as per above. If, for each file, a system also factors in a page load priority P, and also a list of the other files among the M files upon which the file depends, a system can redefine T as a function of these as well as B and u, and then the system can find the scheduling plan S_n that will minimize T_page. Executing this plan in a dynamic system to actually determine the assignment of files to connections in a pool (which can be done in a system such as the browser acceleration component 206a) allows the system to use a web page model and connection models described in this document to reduce the contribution of downloading objects to overall page load time.

Another way to handle priority is to perform scheduling in two stages, where P may be considered a set of such high priority files. The first stage of one potential embodiment involves: max_over_n(T_n(S_n)) for files in P. R_n may then be the resultant transfer time after the first stage. The second stage involves: max_over_n(r_n+T'_n(S_n)) for files not in P where T'_n incorporate the resultant connection states from the first optimization. This can be applied repeatedly for each level of priority across the files in the set.

Another way to handle file dependency is through a constraint which can be applied to restrict the search space of S during the optimization. For example, if B3 must be received before B1, a constraint should have the form C_3(S_n)<C_1(S_n) for all n where C_m is a function that returns the transfer time of B_m according to the scheduling plan S_n. For instance, if S_4={B2,B1} then C_1(S_4)=F (B_2; u_4) because the start time of B_1 is determined by the preceding files in the plan, which is B2.

In addition, as mentioned above, server processing time can also be factored into the function T. For each file, the system may have a server processing time PT, and this piece of data may further improve the model and allow a system to come up with a scheduling plan S_n that again minimizes this new T_page. If this scheduling plan was applied in a dynamic system, it would again further improve the ability to reduce page load time.

Also, the system may be dealing with a dynamic system. The connections are dynamic, the priorities are dynamic, and even the list of files itself is dynamic as the browser parses the objects in the page and generates new URLs to be requested that are not in the prefetch list. The above optimization is run at any point in time to come up with an optimal schedule plan for downloading files, but the schedule plan needs to be re-run and scheduling decisions need to be revisited as conditions change. So, for instance, if a packet is dropped on a connection that has a very high throughput, it will suddenly drop back to a lower throughput, which would impact the u for that connection in the equations above.

Also many of the other ideas in this document are not reflected in the above formulation. For instance, a system can split up certain files and download them over multiple connections. The formulation above is simply an attempt to define the type of algorithm that would be executed at runtime to incorporate the information from the web page model from the analysis server and the dynamic connection models to optimize the scheduling of files across a pool of connections to minimize page load time.

These faster connections from the connection models may be identified by current speed data during the second transaction, and may further be informed by historical data if the proxy server has received data over a particular socket of the content server. This connection model may also be updated with generalized information about a server that may be applied to all sockets of a particular content server. This sort of secondary information may be given a lower weight in a model of performance data than speed and latency data from current downloads.

A variety of acceptable prefetch steps and methods may be used to prefetch child objects. In FIG. 10B, the prefetching includes sending an updated prefetch list to the client-side optimizer in step 21 where the entry is added to the prefetch list in step 22 so that a later request for the child will be identified as having been prefetched. The server-side optimizer then requests the child object in step 23. The child is generated by the content server in step 24, and communicated to the client-side optimizer in steps 25 through 27. In step 27, the child is stored in the client-side optimizer for use in responding to a subsequent request.

FIG. 10B continues in steps 9 and 29 through 32 to describe a successful prefetch hit, where the child is requested in step 9. The client-side optimizer serves the prefetched generated child response in step 29 and the user application receives it in step 30, and an update to a data model occurs in steps 31 and 32. If no related child was later requested, or the parameter generated the wrong child and a different child request was made instead, the object stored in step 27 will not be sent to the user application, and an update will still occur indicating the miss or fail to the server-side optimizer. The process may then repeat and continue, where the model for identifying parameters and associated children is updated, and the system operates with various combinations of requests and prefetched responses.

Figure 11:
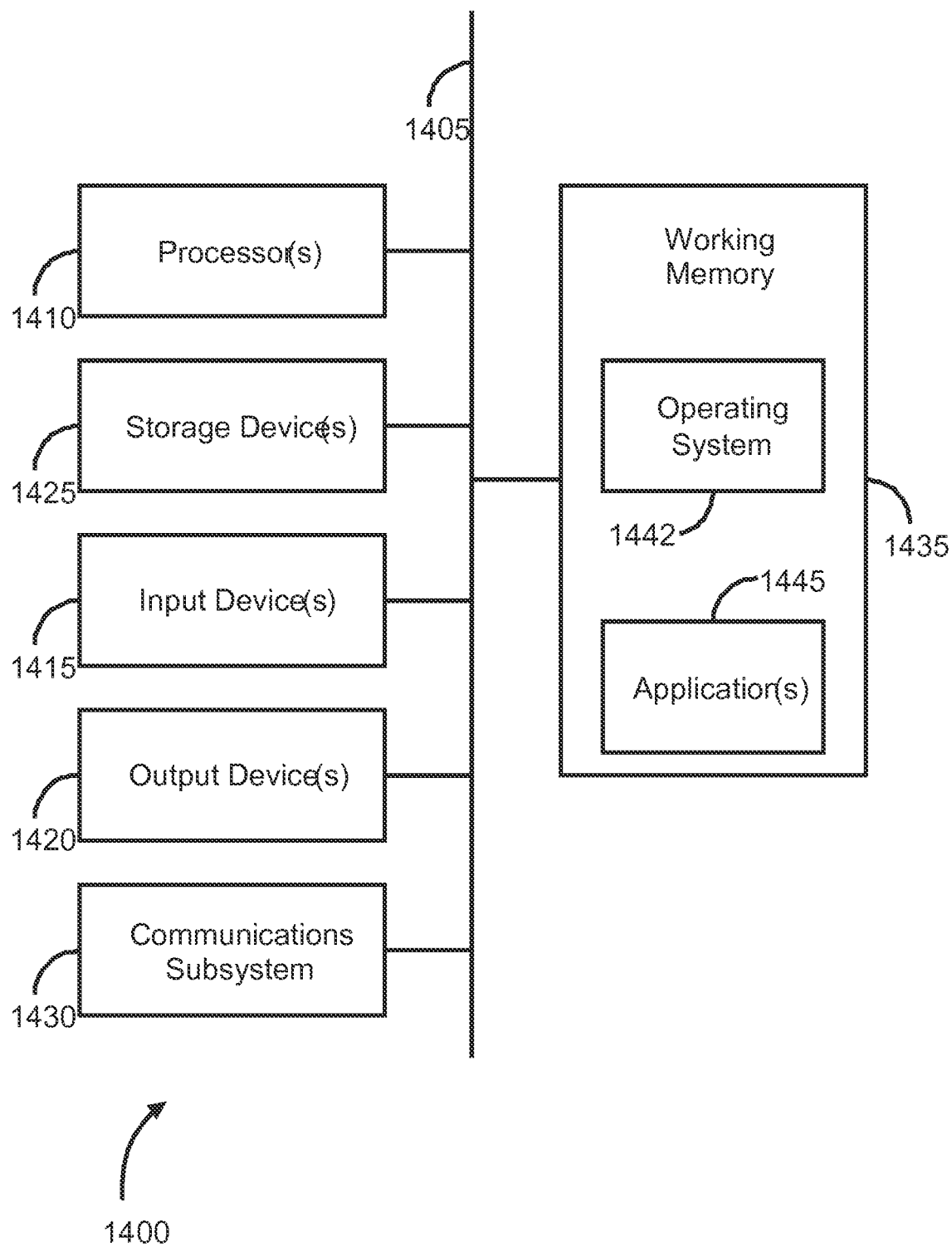
FIG. 11 illustrates a block diagram of one potential implementation of a communications system in accordance with one potential embodiment of the innovations presented herein.

FIG. 11 provides a schematic illustration of one embodiment of a computer system 1400 that can perform the methods of the invention, as described herein, and/or can function, for example, as any part of client 105, proxy server 120, or content server 130 in FIG. 1B. It should be noted that FIG. 11 is meant only to provide a generalized illustration of various components, any or all of which may be utilized, as appropriate. FIG. 11, therefore, broadly illustrates how individual system elements may be implemented in a relatively separated or relatively more integrated manner.

The computer system 1400 is shown comprising hardware elements that can be electrically coupled via a bus 1405 (or may otherwise be in communication, as appropriate). The hardware elements can include one or more processors 1410, including, without limitation, one or more general-purpose processors and/or one or more special-purpose processors (such as digital signal processing chips, graphics acceleration chips, and/or the like); one or more input devices 1415, which can include, without limitation, a mouse, a keyboard, and/or the like; and one or more output devices 1420, which can include, without limitation, a display device, a printer, and/or the like.

The computer system 1400 may further include (and/or be in communication with) one or more storage devices 1425, which can comprise, without limitation, local and/or network accessible storage and/or can include, without limitation, a disk drive, a drive array, an optical storage device, a solid-state storage device such as a random access memory ("RAM") and/or a read-only memory ("ROM"), which can be programmable, flash-updateable, and/or the like. The computer system 1400 might also include a communications subsystem 1430, which can include, without limitation, a modem, a network card (wireless or wired), an infrared communication device, a wireless communication device, and/or chipset (such as a Bluetooth® [1] device, an 802.11 device, a WiFi device, a WiMax device, cellular communication facilities, etc.), and/or the like. The communications subsystem 1430 may permit data to be exchanged with a network (such as the network described below, to name one example), and/or any other devices described herein. In many embodiments, the computer system 1400 will further comprise a working memory 1435, which can include a RAM or ROM device, as described above.

The computer system 1400 can also comprise software elements, shown as being currently located within the working memory 1435, including an operating system 1442 and/or other code, such as one or more applications 1445, which may comprise computer programs of the invention and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer-readable storage medium, such as the storage device(s) 1425 described above. In some cases, the storage medium might be incorporated within a computer system, such as the system 1400. In other embodiments, the storage medium might be separate from a computer system (i.e., a removable medium, such as a compact disc, etc.), and/or provided in an installation package, such that the storage medium can be used to program a general-purpose computer with the instructions/code stored thereon. These instructions might take the form of executable code, which is executable by the computer system 1400 and/or might take the form of source and/or installable code, which, upon compilation and/or installation on the computer system 1400 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 1400) to perform methods of the invention. According to a set of embodiments, some or all of the procedures of such methods are performed by the computer system 1400 in response to processor 1410 executing one or more sequences of one or more instructions (which might be incorporated into the operating system 1442 and/or other code, such as an application 1445) contained in the working memory 1435. Such instructions may be read into the working memory 1435 from another machine-readable medium, such as one or more of the storage device(s) 1425. Merely by way of example, execution of the sequences of instructions contained in the working memory 1435 might cause the processor(s) 1410 to perform one or more procedures of the methods described herein.

The terms "machine-readable medium" and "computer-readable medium", as used herein, refer to any medium that participates in providing data that causes a machine to operate in a specific fashion. In an embodiment implemented using the computer system 1400, various machine-readable media might be involved in providing instructions/code to processor(s) 1410 for execution and/or might be used to store and/or carry such instructions/code (e.g., as signals). In many implementations, a computer-readable medium is a physical and/or tangible storage medium. Such a medium may take many forms, including, but not limited to, non-volatile media, volatile media, and transmission media. Non-volatile media includes, for example, optical or magnetic disks, such as the storage device(s) 1425. Volatile media includes, without limitation, dynamic memory, such as the working memory 1435. Transmission media includes coaxial cables, copper wire, and fiber optics, including the wires that comprise the bus 1405, as well as the various components of the communications subsystem 1430 (and/or the media by which the communications subsystem 1430 provides communication with other devices). Hence, transmission media can also take the form of waves (including, without limitation, radio, acoustic, and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 1410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1400. These signals, which might be in the form of electromagnetic signals, acoustic signals, optical signals, and/or the like, are all examples of carrier waves on which instructions can be encoded, in accordance with various embodiments of the invention.

The communications subsystem 1430 (and/or components thereof) generally will receive the signals, and the bus 1405 then might carry the signals (and/or the data, instructions, etc., carried by the signals) to the working memory 1435, from which the processor(s) 1410 retrieves and executes the instructions. The instructions received by the working memory 1435 may optionally be stored on a storage device(s) 1425 either before or after execution by the processor(s) 1410.

Figure 12:
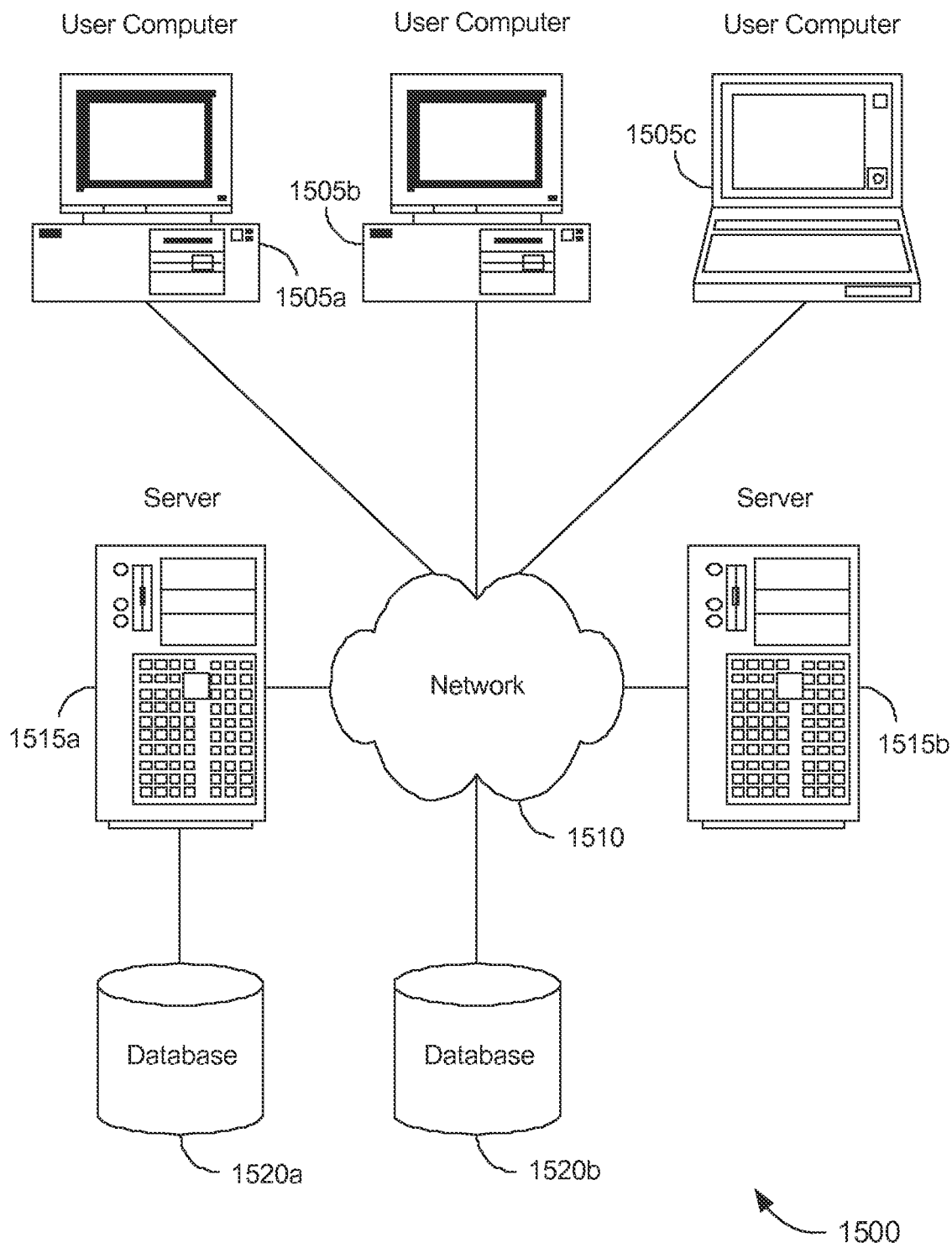
FIG. 12 illustrates a block diagram of one potential implementation of a computing device in accordance with one potential embodiment of the innovations presented herein.

A set of embodiments comprises systems for implementing staged configurator modeling. In one embodiment, proxy server 120 and/or client 105 (as shown in FIG. 1B) may be implemented as computer system 1400 in FIG. 11. Merely by way of example, FIG. 12 illustrates a schematic diagram of a system 1500 that can be used in accordance with one set of embodiments. The system 1500 can include one or more user computers 1505. The user computers 1505 can be general-purpose personal computers (including, merely by way of example, personal computers and/or laptop computers running any appropriate operating systems and/or workstation computers running any of a variety of commercially-available UNIX® [4] or UNIX-like operating systems.) These user computers 1505 can also have any of a variety of applications, including one or more applications configured to perform methods of the invention, as well as one or more office applications, database client and/or server applications, and web browser applications. Alternatively, the user computers 1505 can be any other electronic device, such as a thin-client computer, Internet-enabled mobile telephone, and/or personal digital assistant (PDA), capable of communicating via a network (e.g., the network 1510 described below) and/or displaying and navigating web pages or other types of electronic documents. Although the exemplary system 1500 is shown with three user computers 1505a-c, any number of user computers can be supported.

Certain embodiments of the invention operate in a networked environment, which can include a network 1510. The network 1510 can be any type of network familiar to those skilled in the art that can support data communications using any of a variety of commercially-available protocols, including, without limitation, TCP/IP, SNA, IPX, Apple-Talk® [3], and the like. Merely by way of example, the network 1510 can be a local area network ("LAN"), including, without limitation, an Ethernet network, a Token-Ring network and/or the like; a wide-area network (WAN); a virtual network, including, without limitation, a virtual private network ("VPN"); the Internet; an intranet; an extranet; a public switched telephone network ("PSTN"); an infrared network; a wireless network, including, without limitation, a network operating under any of the IEEE 802.11 suite of protocols, the Bluetooth protocol known in the art, and/or any other wireless protocol; and/or any combination of these and/or other networks.

Embodiments of the invention can include one or more servers 1515. Each of the servers 1515 may be configured with an operating system, including, without limitation, any of those discussed above, as well as any commercially (or freely) available server operating systems. Each of the servers 1515 may also be running one or more applications, which can be configured to provide services to one or more user computers 1505 and/or other servers 1515.

Merely by way of example, one of the servers 1515 may be a web server, which can be used, merely by way of example, to process requests for web pages or other electronic documents from user computers 1505. The web server can also run a variety of server applications, including HTTP servers, FTP servers, CGI servers, database servers, Java® servers, and the like. In some embodiments of the invention, the web server may be configured to serve web pages that can be operated within a web browser on one or more of the user computers 1505 to perform methods of the invention.

The servers 1515, in some embodiments, might include one or more application servers, which can include one or more applications accessible by a client running on one or more of the user computers 1505 and/or other servers 1515. Merely by way of example, the server(s) 1515 can be one or more general-purpose computers capable of executing programs or scripts in response to the user computers 1505 and/or other servers 1515, including, without limitation, web applications (which might, in some cases, be configured to perform methods of the invention). Merely by way of example, a web application can be implemented as one or more scripts or programs written in any suitable programming language, such as Java, C, C# or C++, and/or any scripting language, such as Perl, Python, or TCL, as well as combinations of any programming/scripting languages. The application server(s) can also include database servers, including without limitation those commercially available from Oracle, Microsoft, Sybase, IBM, and the like, which can process requests from clients (including, depending on the configurator, database clients, API clients, web browsers, etc.) running on a user computer 1505 and/or another server 1515. In some embodiments, an application server can create web pages dynamically for displaying the information in accordance with embodiments of the invention, such as information displayed on web browser 206 in FIG. 3. Data provided by an application server may be formatted as web pages (comprising HTML, JavaScript®, etc., for example) and/or may be forwarded to a user computer 1505 via a web server (as described above, for example). Similarly, a web server might receive web page requests and/or input data from a user computer 1505 and/or forward the web page requests and/or input data to an application server. In some cases a web server may be integrated with an application server.

In accordance with further embodiments, one or more servers 1515 can function as a file server and/or can include one or more of the files (e.g., application code, data files, etc.) necessary to implement methods of the invention incorporated by an application running on a user computer 1505 and/or another server 1515. Alternatively, as those skilled in the art will appreciate, a file server can include all necessary files, allowing such an application to be invoked remotely by a user computer 1505 and/or server 1515. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 1520. The location of the database(s) 1520 is discretionary: merely by way of example, a database 1520a might reside on a storage medium local to (and/or resident in) a server 1515a (and/or a user computer 1505). Alternatively, a database 1520b can be remote from any or all of the computers 1505 or servers 1515a,b, so long as the database 1520b can be in communication (e.g., via the network 1510) with one or more of these. In a particular set of embodiments, a database 1520 can reside in a storage-area network ("SAN") familiar to those skilled in the art. (Likewise, any necessary files for performing the functions attributed to the user computers 1505 or servers 1515 can be stored locally on the respective computer and/or remotely, as appropriate.) In one set of embodiments, the database 1520 can be a relational database, such as an Oracle® database, that is adapted to store, update, and retrieve data in response to SQL-formatted commands. The database might be controlled and/or maintained by a database server, as described above, for example.

FIG. 13 then shows an additional embodiment. In the embodiment of FIG. 13, the system may include a user system 202, a proxy client 212, and a proxy server 232. User system 202 may include a web browser 206 which presents web pages to a system and manages user level interactions for initiating web page transactions with content servers to render web pages at user system 202, as described above and throughout this application.

The user system 202 may include a client graphical user interface (GUI) 210. Client GUI 210 may allow a user to configure performance aspects of the system 200. For example, the user may adjust the compression parameters and/or algorithms, content filters (e.g., filters that block elicit websites), and enable or disable various features used by the system 200. In one embodiment, some of the features may include network diagnostics and error reporting as well as controlling, for example, prefetch response manager 224. Such control may be adding and/or removing pages (i.e., URLs) to or from a whitelist and/or blacklist.

Additional details of one potential embodiment of devices and systems for acceleration are now described within the context of the elements of FIG. 3. FIG. 3 describes a proxy server embodiment for acceleration, but as described above, elements enabling acceleration may also be enabled within a proxy client, a browser acceleration module, or any other such system. During the function of user system 202, the user selects a universal recourse locator (URL) address which directs web browser 206 (e.g., Internet Explorer®, Mozilla Firefox®, Netscape Navigator®, etc.) to a website (e.g., cnn.com, google.com, yahoo.com, etc.). In a further embodiment, web browser 206 may check browser cache 204 to determine whether the website associated with the selected URL is located within browser cache 204. If the website is located within browser cache 204, the amount of time the website has been in the cache is checked to determine if the cached website is "fresh" (i.e., new) enough to use. For example, the amount of time that a website may be considered fresh may be five minutes; however, other time limits may be used. Consequently, if the website has been cached and the website is considered fresh, then web browser 206 renders the cached page. However, if the website has either not been cached or the cached webpage is not fresh, web browser 206 sends a request to the Internet for the website.

In one embodiment, redirector 208 intercepts the request sent from web browser 206. Redirector 208 instead sends the request through a local bus 205 to proxy client 212, as shown in FIG. 13. In some embodiments, proxy client 212 may be implemented as a software application running on user system 202. In an alternative embodiment, proxy client 212 may be implemented on a separate computer system and connected to user system 202 via a high speed/low latency link (e.g., a branch office LAN subnet, etc.). In one embodiment, proxy client 212 includes a request parser 216. Request parser 216 may check cache optimizer 214 to determine if a cached copy of the requested website may still be able to be used. Cache optimizer 214 is in communication with browser cache 204 in order to have access to cached websites. Cache optimizer 214 is able to access browser cache 204 without creating a redundant copy of the cached websites, thus requiring less storage space.

According to one embodiment, cache optimizer 214 implements more effective algorithms to determine whether a cached website is fresh. In one embodiment, cache optimizer 214 may implement the cache expiration algorithms, i.e., HTTP vs. RFC 2616, which may not be natively supported in web browser 206. For example, browser cache 204 may inappropriately consider a cached website too old to use; however, cache optimizer 214 may still be able to use the cached website. More efficient use of cached websites can improve browsing efficiency by reducing the number of Internet accesses.

In one embodiment, if the requested website is not able to be accessed from the cached websites, request parser 216 checks prefetch manager 220 to determine if the requested website has been prefetched. Prefetching a website occurs when content from the website is accessed, downloaded, and stored before a request to the website is made by web browser 206. Prefetching can potentially save round trips of data access from user system 202 to the Internet.

In a further embodiment, if the requested website has not been prefetched, then request parser 216 forwards the request to a transmission and protocol module 228a. Transmission and protocol module 228a may include a request encoder that encodes the request into a compressed version of the request using one of many possible data compression algorithms. For example, these algorithms may employ a coding dictionary which stores strings so that data from previous web objects can be used to compress data from new pages. Accordingly, where the request for the website is 550 B in total, the encoded request may be as small as 50 B. This level of compression can save bandwidth on a connection, such as high latency link 230. In one embodiment, high latency link 230 may be a wireless link, a cellular link, a satellite link, a dial-up link, etc.

In one embodiment, transmission and protocol module 228a may include encoding for multiple protocols, such as Intelligent Compression Technologies transport protocol (ITP) and the standard transmission control protocol (TCP). In certain embodiments, both connection based protocols (such as TCP) and non-connection based protocols (such as UDP) may be supported, with connection modeling only applied to connection based protocols. In one embodiment, transmission and protocol module 228a maintains a persistent connection with proxy server 232. The persistent connection between proxy client 212 and proxy server 232 enables system 200 to eliminate the inefficiencies and overhead costs associated with creating a new connection for each request.

In one embodiment, the encoded request is forwarded to transmission and protocol module 228b and is decoded. Transmission and protocol module 228b may use a decoder which is appropriate for the encoding performed by transmission and protocol module 228a. In one embodiment, this process utilizes a coding dictionary in order to translate the encoded request back into a standard format which can be accessed by the destination website.

A request may be sent directly from proxy server 232 to a content server over a network connection such as low latency link 231. Alternately, as part of an analysis of any web transaction, the request may be sent to prefetch scanner 246, web transaction tracking 248, client cache model 250, cookie model 252, and/or request synthesizer 254 for various analysis including to analyze and improve web transactions. For example, if the HTTP request includes a cookie (or other special instructions), such as a "referred by" or type of encoding accepted, information about the cookie or instructions may be stored in a cookie model 252. After or concurrent with the analysis, the proxy server 132 may transmit the decoded request to the destination website over a low latency link 231. Low latency link 231 may be, for example, a cable modem connection, a digital subscriber line (DSL) connection, a T1 connection, a fiber optic connection, or another suitable network connection.

In response to the request, a response parser 244 receives a response from the requested website. In one embodiment, this response may include an attachment, such as an image and/or text file. Some types of attachments, such as HTML, XML, CSS, or JavaScript, may include references to other "in-line" objects that may be needed to render a requested web page. In one embodiment, when response parser 244 detects an attachment type that may contain such references to "in-line" objects, response parser 244 may forward the objects to a prefetch scanner 246.

In one embodiment, prefetch scanner 246 scans the attached file and identifies URLs of in-line objects that may be candidates for prefetching. For example, candidates may be identified by HTML syntax, such as the token "img src=". In addition, objects that may be needed for the web page may also be specified in JavaScript that appears within the HTML or CSS page or within a separate JavaScript file. In one embodiment, the identified candidates are added to a candidate list.

In one embodiment, for the candidate URLs, prefetch scanner 246 may notify prefetch response manager 224 of the context in which the object was identified, such as the type of object in which it was found and/or the syntax in which the URL occurred. This information may be used by prefetch response manager 224 to determine the probability that the URL will actually be requested by web browser 206.

According to a further embodiment, the candidate list is forwarded to web transaction tracking 248. Web transaction tracking 248 may be used to track which URLs should be allowed to be prefetched, and may perform parameter correlation for parameters identified in a web transaction that are correlated with child HTTP requests. Web transaction tracking 248 may also include whitelists and blacklists for known errors in prefetching systems that may select an incorrect object for prefetching repetitively. These lists may be based on the host (i.e., the server that is supplying the URL), the file type (e.g., application service provider (ASP) files should not be prefetched), etc. Accordingly, a whitelist and blacklist may control prefetching behavior by indicating which URLs on the candidate list should or should not be prefetched. In many instances with certain web pages/file types, prefetching may not work. In addition to ASP files, web pages which include fields or cookies may have problems with prefetching.

In another potential embodiment, web transaction tracking 248 may implement connection models and matching algorithms for matching objects to the highest performance connections with particular content servers. Connection performance data may be identified using response parser 244 and communicated to web transaction tracking 248.

Object requests identified by the system may then be matched to particular connections using, for example, socket identifiers for the low latency link 231, and the requests for the objects may be sent through the system. In other embodiments, web transaction tracking 248 may simply identify high performance sockets for low latency link 231 using connection models and forward the performance information to another portion of the system 200 that matches object requests with particular connections.

In one embodiment, once the candidate list has been passed through a whitelist and a blacklist, a modified candidate list is generated and then forwarded to a client cache model 250. The client cache model 250 attempts to model which items from the list will be included in browser cache 204. As such, those items are removed from the modified candidate list. Subsequently, the updated modified candidate list is forwarded to a request synthesizer 254 which creates an HTTP request in order to prefetch each item in the updated modified candidate list. The HTTP request header may include cookies and/or other instructions appropriate to the website and/or the preferences of web browser 206 using information obtained from cookie model 252. The prefetch HTTP requests may then be transmitted through low latency link 231 to the corresponding website.

In alternative embodiments, objects identified for potential prefetching may be assigned a priority rather than being checked against a whitelist or a blacklist. Objects assigned a priority may be sent to a prefetch accumulator as part of transmission and protocol module 228b, with the highest currently identified prefetch candidates sent over the network whenever resources are available for prefetching.

When an object is received at response parser 244, response parser 244 may pass the response to prefetch scanner 246 to identify additional child HTTP candidates for prefetching, and may concurrently or subsequently forward the response to transmission and protocol module 228b to be transmitted back to the user system 102. A response encoder, in certain embodiments, accesses a coding dictionary in order to encode the prefetched response just as described above for the request. Transmission and protocol module 228b may then forward the encoded response over high latency link 230 and then to transmission and protocol module 228a, where the response may be decoded and forwarded to response manager 224. In one embodiment, if the response is a prefetched response, then response manager 224 creates a prefetch socket to receive the prefetched item as it is downloaded and manage delivery of the prefetched object when it is later requested in the normal course of the relevant web page transaction. Response manager 224 then transmits the response over local bus 205 to redirector 208. Redirector 208 then forwards the response to web browser 206 which renders the content of the response.

While the invention has been described with respect to exemplary embodiments, one skilled in the art will recognize that numerous modifications are possible while remaining within the scope of the present innovations. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware, and/or software configurator. Similarly, while various functionalities are ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with (or without) certain features for ease of description and to illustrate exemplary features, the various components and/or features described herein with respect to a particular embodiment can be substituted, added, and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method comprising:
    obtaining, by a client-side computing device, models for a plurality of TCP connections, each TCP connection of the plurality of TCP connections established between a client device and a different content server;
    receiving, at the client-side computing device, one or more requests for a plurality of objects as part of a pending web page transaction;
    determining, by the client-side computing device during the pending web page transaction, one or more characteristics of the pending web page transaction;
    for a first object of the plurality of objects, selecting, by the client-side computing device during the pending web page transaction, a first TCP connection of the plurality of TCP connections based on a first model of the models and one of the one or more characteristics of the pending web page transaction;
    for a second object of the plurality of objects, selecting, by the client-side computing device during the pending web page transaction, a second TCP connection of the plurality of TCP connections based on a second model of the models and one of the one or more characteristics of the pending web page transaction;
    requesting, as a part of the pending web page transaction by the client-side computing device, the first object using the first TCP connection; and
    requesting, as a part of the pending web page transaction by the client-side computing device, the second object using the second TCP connection.

2. The method of claim 1, further comprising:
    receiving, by the client-side computing device, a first portion of the first object in response to requesting the first object;
    determining, by the client-side computing device based on a model of a third TCP connection of the plurality of TCP connections, to switch downloading of the first object from the first TCP connection to the third TCP connection; and switching, by the client-side computing device, the downloading of the first object from the first TCP connection to the third TCP connection.

3. The method of claim 1, wherein the client-side computing device is the client device.

4. The method of claim 1, wherein the client-side computing device comprises a client-side proxy.

5. The method of claim 4, wherein the receiving the one or more requests for the plurality of objects comprises intercepting one or more of the one or more requests by the client-side proxy.

6. The method of claim 1, wherein the one or more requests for the plurality of objects comprises a root request and at least one child request.

7. The method of claim 1, further comprising receiving, by the client-side computing device, hint information or prefetch assistance information associated with the pending web page transaction, and wherein determining the one or more characteristics of the pending web page transaction is based on the hint information or prefetch assistance information.

8. The method of claim 1, wherein the one or more characteristics of the pending web page transaction comprise one or more of a size of one or more objects to be requested during the pending web page transaction, an amount of time a content server will require to generate of one or more objects to be requested during the pending web page transaction, interdependencies between objects to be requested during the pending web page transaction, priority information for one or more of the one or more objects to be requested during the pending web page transaction.

9. The method of claim 1, further comprising receiving, by the client-side computing device, TCP connection information associated with at least one TCP connection of the plurality of TCP connections from a remote computing device, and wherein selecting the first or second TCP connection is based on the TCP connection information.

10. The method of claim 1, further comprising estimating a future download rate of one of the first or second TCP connections, and wherein selecting the first or second TCP connection is based on the estimated future download rate.

11. The method of claim 10, wherein the future download rate is based on a TCP slow start model and a data rate history associated with the respective first or second TCP connection.

12. The method of claim 1, further comprising:
determining TCP connection information for one of the first or second TCP connections; and
updating the respective first or second model based on the TCP connection information.

13. The method of claim 12, further comprising:
determining a plurality of objects to be requested during the pending web page transaction; and
adjusting an allocation of each object of the plurality of objects to a TCP connection of the plurality of TCP connections based on the updated first or second model.

14. The method of claim 1, wherein updating the respective first or second model is in response to a scheduled update time or occurrence of a trigger event.

15. A client-side computing device comprising:
a non-transitory computer-readable medium; and
a processor communicatively coupled to the non-transitory computer-readable medium, the processor configured to execute processor-executable instructions stored in the non-transitory computer-readable medium to:
obtain models for a plurality of TCP connections, each TCP connection of the plurality of TCP connections established between a client device and a different content server;
receive one or more requests for a plurality of objects as part of a web page transaction;
determine, during the web page transaction, one or more characteristics of the web page transaction;
for a first object of the plurality of objects, select, during the web page transaction, a first TCP connection of the plurality of TCP connections based on a first model of the models and one of the one or more characteristics of the web page transaction;
for a second object of the plurality of objects, select, during the web page transaction, a second TCP connection of the plurality of TCP connections based on a second model of the models and one of the one or more characteristics of the web page transaction;
request, as a part of the web page transaction, the first object using the first TCP connection; and
request, as a part of the web page transaction, the second object using the second TCP connection.

16. The client-side computing device of claim 15, wherein the processor is configured to execute processor-executable code stored in the non-transitory computer-readable medium to:
receive a first portion of the first object in response to the request for the first object;
determine, based on a model of a third TCP connection of the plurality of TCP connections, to switch downloading of the first object from the first TCP connection to the third TCP connection; and
switch the downloading of the first object from the first TCP connection to the third TCP connection.

17. The client-side computing device of claim 15, wherein the client-side computing device is the client device.

18. The client-side computing device of claim 15, further comprising a client-side proxy.

19. The client-side computing device of claim 18, wherein the processor is configured to execute processor-executable code stored in the non-transitory computer-readable medium to intercept one or more of the one or more requests by the client-side proxy.

20. The client-side computing device of claim 15, wherein the one or more requests for the plurality of objects comprises a root request and at least one child request.

21. The client-side computing device of claim 15, wherein the processor is configured to execute processor-executable code stored in the non-transitory computer-readable medium to:
receive hint information or prefetch assistance information associated with the web page transaction; and
determine the one or more characteristics of the web page transaction based on the hint information or prefetch assistance information.

22. The client-side computing device of claim 15, wherein the one or more characteristics of the web page transaction comprise one or more of a size of one or more objects to be requested during the web page transaction, an amount of time a content server will require to generate of one or more objects to be requested during the web page transaction, interdependencies between objects to be requested during the web page transaction, priority information for one or more of the one or more objects to be requested during the web page transaction.

23. The client-side computing device of claim 15, wherein the processor is configured to execute processor-executable code stored in the non-transitory computer-readable medium to:
- receive TCP connection information associated with at least one TCP connection of the plurality of TCP connections from a remote computing device; and
- select the first or second TCP connection based on the TCP connection information.

24. The client-side computing device of claim 15, wherein the processor is configured to execute processor-executable code stored in the non-transitory computer-readable medium to:
- estimate a future download rate of one of the first or second TCP connections; and
- select the first or second TCP connection based on the estimated future download rate.

25. The client-side computing device of claim 24, wherein the future download rate is based on a TCP slow start model and a data rate history associated with the respective first or second TCP connection.

26. The client-side computing device of claim 15, wherein the processor is configured to execute processor-executable code stored in the non-transitory computer-readable medium to:
- determine TCP connection information for one of the first or second TCP connections; and
- update the respective first or second model based on the TCP connection information.

27. The client-side computing device of claim 26, wherein the processor is configured to execute processor-executable code stored in the non-transitory computer-readable medium to:
- determine a plurality of objects to be requested during the web page transaction; and
- adjust an allocation of each object of the plurality of objects to a TCP connection of the plurality of TCP connections based on the updated first or second model.

28. The client-side computing device of claim 26, wherein updating the respective first or second model is in response to a scheduled update time or occurrence of a trigger event.

* * * * *